US012786756B2

(12) United States Patent
Ren et al.

(10) Patent No.: US 12,786,756 B2
(45) **Date of Patent: *Nov. 3, 2026**

(54) MODEL STATUS MONITORING, REPORTING, AND FALLBACK IN MACHINE LEARNING APPLICATIONS

(71) Applicant: QUALCOMM Incorporated, San Diego, CA (US)

(72) Inventors: Yuwei Ren, Beijing (CN); Ruiming Zheng, Beijing (CN); Chenxi Hao, Beijing (CN); Xipeng Zhu, San Diego, CA (US); Shankar Krishnan, San Diego, CA (US); Taesang Yoo, San Diego, CA (US); Yu Zhang, San Diego, CA (US); Hao Xu, Beijing (CN); Yin Huang, Beijing (CN)

(73) Assignee: QUALCOMM Incorporated, San Diego, CA (US)

( * ) Notice: Subject to any disclaimer, the term of this patent is extended or adjusted under 35 U.S.C. 154(b) by 437 days.

This patent is subject to a terminal disclaimer.

(21) Appl. No.: 18/548,065

(22) PCT Filed: May 14, 2021

(86) PCT No.: PCT/CN2021/093817

§ 371 (c)(1),
(2) Date: Aug. 25, 2023

(87) PCT Pub. No.: WO2022/236807

PCT Pub. Date: Nov. 17, 2022

(65) Prior Publication Data

US 2024/0147267 A1 May 2, 2024

(51) Int. Cl.

*H04W 24/04* (2009.01)
*H04L 41/0654* (2022.01)

(Continued)

(52) U.S. Cl.

CPC ......... *H04W 24/04* (2013.01); *H04L 41/0654* (2013.01); *H04L 41/16* (2013.01); *H04W 24/02* (2013.01)

(58) Field of Classification Search

None

See application file for complete search history.

(56) References Cited

U.S. PATENT DOCUMENTS

| | | | | |
|---|---|---|---|---|
| 12,119,981 B2 * | 10/2024 | Bisht | .................... | G06N 3/0499 |
| 2007/0037601 A1 * | 2/2007 | Mittal | .................... | H04W 24/10 |
| | | | | 455/513 |

(Continued)

FOREIGN PATENT DOCUMENTS

| | | |
|---|---|---|
| CN | 110139315 A | 8/2019 |
| CN | 111835548 B | 3/2021 |

(Continued)

OTHER PUBLICATIONS

Supplementary European Search Report—EP21941377—Search Authority—Munich—Dec. 19, 2024.

(Continued)

*Primary Examiner* — Eunsook Choi

(74) *Attorney, Agent, or Firm* — QUALCOMM Incorporated

(57) ABSTRACT

A method of wireless communications by a user equipment (UE) includes communicating with a network based on a machine learning model for wireless communication. The method also includes monitoring a status of the machine learning model for wireless communication. The method further includes reporting the status of the machine learning model for wireless communication using a predetermined resource according to a predetermined format. The method also includes falling back to communicating with a fallback procedure, instead of the machine learning model for wireless communication, to maintain wireless communication (Continued)

with the network in response to the status of the machine learning model indicating a model failure.

25 Claims, 19 Drawing Sheets

(51) Int. Cl.

| | |
|---|---|
| ***H04L 41/16*** | (2022.01) |
| ***H04W 24/02*** | (2009.01) |

(56) References Cited

U.S. PATENT DOCUMENTS

| | | | | |
|---|---|---|---|---|
| 2018/0189674 | A1 | 7/2018 | Hillard et al. | |
| 2021/0182694 | A1* | 6/2021 | Wu | G06N 3/0455 |
| 2021/0375141 | A1* | 12/2021 | Gracia Berna | G08G 5/76 |
| 2022/0366494 | A1* | 11/2022 | Cella | H04L 9/3231 |
| 2022/0391300 | A1* | 12/2022 | Trapani | G06F 11/3409 |
| 2023/0216745 | A1* | 7/2023 | Chen | H04L 41/0823<br>370/252 |
| 2024/0129759 | A1* | 4/2024 | Ren | G06F 11/0778 |

FOREIGN PATENT DOCUMENTS

| | | | |
|---|---|---|---|
| CN | 112512058 | A | 3/2021 |
| CN | 112561070 | A | 3/2021 |
| WO | 2020139181 | A1 | 7/2020 |
| WO | 2021064275 | A1 | 4/2021 |

OTHER PUBLICATIONS

International Search Report and Written Opinion—PCT/CN2021/093817—ISA/EPO—Jan. 30, 2022.

* cited by examiner

MODEL STATUS MONITORING, REPORTING, AND FALLBACK IN MACHINE LEARNING APPLICATIONS

FIELD OF THE DISCLOSURE

Aspects of the present disclosure generally relate to wireless communications, and more particularly to techniques and apparatuses for model status monitoring, reporting, and fallback in machine learning applications.

BACKGROUND

Wireless communications systems are widely deployed to provide various telecommunications services such as telephony, video, data, messaging, and broadcasts. Typical wireless communications systems may employ multiple-access technologies capable of supporting communications with multiple users by sharing available system resources (e.g., bandwidth, transmit power, and/or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and long term evolution (LTE). LTE/LTE-Advanced is a set of enhancements to the universal mobile telecommunications system (UMTS) mobile standard promulgated by the Third Generation Partnership Project (3GPP).

A wireless communications network may include a number of base stations (BSs) that can support communications for a number of user equipment (UEs). A user equipment (UE) may communicate with a base station (BS) via the downlink and uplink. The downlink (or forward link) refers to the communications link from the BS to the UE, and the uplink (or reverse link) refers to the communications link from the UE to the BS. As will be described in more detail, a BS may be referred to as a Node B, a gNB, an access point (AP), a radio head, a transmit and receive point (TRP), a new radio (NR) BS, a 5G Node B, and/or the like.

The above multiple access technologies have been adopted in various telecommunications standards to provide a common protocol that enables different user equipment to communicate on a municipal, national, regional, and even global level. New Radio (NR), which may also be referred to as 5G, is a set of enhancements to the LTE mobile standard promulgated by the Third Generation Partnership Project (3GPP). NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation.

Artificial neural networks may comprise interconnected groups of artificial neurons (e.g., neuron models). The artificial neural network may be a computational device or represented as a method to be performed by a computational device. Convolutional neural networks, such as deep convolutional neural networks, are a type of feed-forward artificial neural network. Convolutional neural networks may include layers of neurons that may be configured in a tiled receptive field. It would be desirable to apply neural network processing to wireless communications to achieve greater efficiencies.

SUMMARY

A method of wireless communications by a user equipment (UE) includes communicating with a network based on a machine learning model for wireless communication. The method also includes monitoring a status of the machine learning model for wireless communication. The method further includes reporting the status of the machine learning model for wireless communication using a predetermined resource according to a predetermined format. The method also includes falling back to communicating with a fallback procedure, instead of the machine learning model for wireless communication, to maintain wireless communication with the network in response to the status of the machine learning model indicating a model failure.

A method of wireless communications by a network is described. The method includes communicating with a user equipment (UE) having a machine learning model for wireless communication. The method also includes receiving a status report of the machine learning model for wireless communication. The method further includes indicating a fallback procedure to the UE to maintain wireless communication in response to the status report of the machine learning model indicating a model failure.

A user equipment (UE) includes a processor and a memory coupled with the processor. The UE also includes instructions stored in the memory. When the instructions are executed by the processor, the UE is operable to communicate with a network based on a machine learning model for wireless communication. The UE is also operable to monitor a status of the machine learning model for wireless communication. The UE is further operable to report the status of the machine learning model for wireless communication using a predetermined resource according to a predetermined format. The UE is also operable to fall back to communicating with a fallback procedure, instead of the machine learning model for wireless communication, to maintain wireless communication with the network in response to the status of the machine learning model indicating a model failure.

A network includes a processor and a memory coupled with the processor. The network also includes instructions stored in the memory. When the instructions are executed by the processor, the network is operable to communicate with a user equipment (UE) having a machine learning model for wireless communication. The network is also operable to receive a status report of the machine learning model for wireless communication. The network is further operable to indicate a fallback procedure to the UE to maintain wireless communication in response to the status report of the machine learning model indicating a model failure.

Aspects generally include a method, apparatus, system, computer program product, non-transitory computer-readable medium, user equipment, base station, wireless communication device, and processing system as substantially described with reference to and as illustrated by the accompanying drawings and specification.

The foregoing has outlined rather broadly the features and technical advantages of examples according to the disclosure in order that the detailed description that follows may be better understood. Additional features and advantages will be described. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed, both their organization and method of operation, together with associated advantages will be better understood from the following description when considered in connection with the accompanying figures. Each of the figures is provided for the purposes of illustration and description, and not as a definition of the limits of the claims.

BRIEF DESCRIPTION OF THE DRAWINGS

So that features of the present disclosure can be understood in detail, a particular description may be had by reference to aspects, some of which are illustrated in the appended drawings. It is to be noted, however, that the appended drawings illustrate only certain aspects of this disclosure and are therefore not to be considered limiting of its scope, for the description may admit to other equally effective aspects. The same reference numbers in different drawings may identify the same or similar elements.

DETAILED DESCRIPTION

Figure 1:
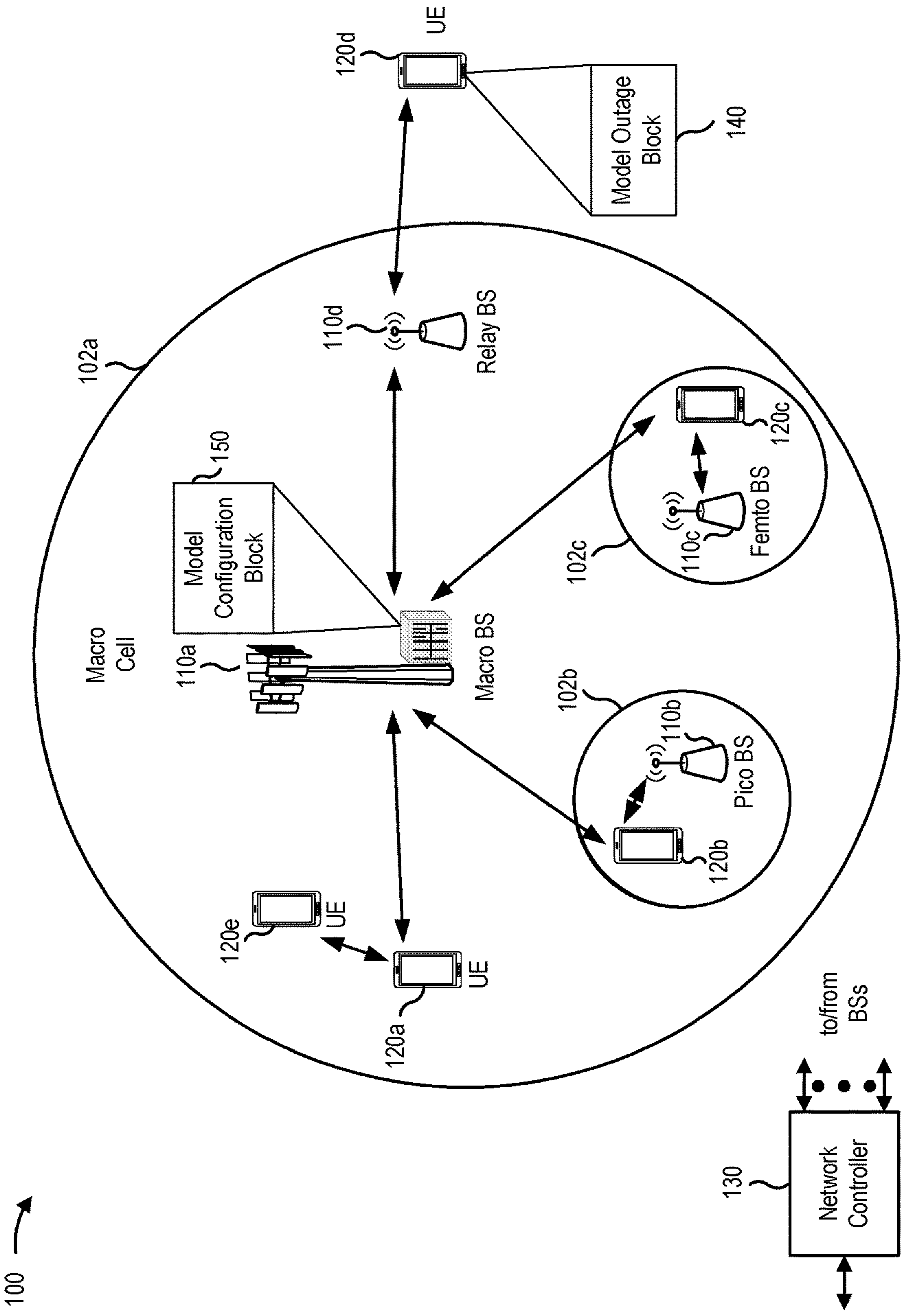
FIG. 1 is a block diagram conceptually illustrating an example of a wireless communications network, in accordance with various aspects of the present disclosure.

Various aspects of the disclosure are described more fully below with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings, one skilled in the art should appreciate that the scope of the disclosure is intended to cover any aspect of the disclosure, whether implemented independently of or combined with any other aspect of the disclosure. For example, an apparatus may be implemented or a method may be practiced using any number of the aspects set forth. In addition, the scope of the disclosure is intended to cover such an apparatus or method, which is practiced using other structure, functionality, or structure and functionality in addition to or other than the various aspects of the disclosure set forth. It should be understood that any aspect of the disclosure disclosed may be embodied by one or more elements of a claim.

Several aspects of telecommunications systems will now be presented with reference to various apparatuses and techniques. These apparatuses and techniques will be described in the following detailed description and illustrated in the accompanying drawings by various blocks, modules, components, circuits, steps, processes, algorithms, and/or the like (collectively referred to as "elements"). These elements may be implemented using hardware, software, or combinations thereof. Whether such elements are implemented as hardware or software depends upon the particular application and design constraints imposed on the overall system.

It should be noted that while aspects may be described using terminology commonly associated with 5G and later wireless technologies, aspects of the present disclosure can be applied in other generation-based communications systems, such as and including 3G and/or 4G technologies.

In an artificial intelligence (AI)-based end-to-end (E2E) wireless system, a neural network model for wireless communication may be incorporated within a transmitter (Tx) and a receiver (Rx) of the AI-based E2E wireless system. In some configurations, a transmitter neural network replaces encoding, modulation, and/or precoding components in the transmitter. In addition, a receiver neural network replaces synchronization, channel estimation, detection, demodulation, and/or decoding components in the receiver. In some aspects, the neural network replaces one, some, or all transmitting/receiving modules of the AI-based E2E wireless system. In these aspect of the present disclosure, offline training and online refinement are performed to configure the transmitter neural network(s) and the receiver neural network(s).

Unfortunately, neural network-based machine learning models for wireless communication are less reliable than traditional machine learning models. Machine learning models for wireless communication are generally considered as data-driven solutions. As a result, a quality of the data determines a performance of a machine learning application for wireless communication. Yet realistic deployment environments of machine learning applications for wireless communication may be more complicated than the expected. This may lead to a further performance degradation of the deployed machine learning model.

In particular, during a model preparation stage (e.g., training/validation/testing), a prepared dataset may be unable to cover all of the potential wireless communication scenarios. As a result, a model performance during monitor a model status and reconfigure the model when performance degrades. Reconfiguration of the model may occur to provide satisfactory model performance, such as for a machine learning model of wireless communication. For example, a machine learning model output may be verified (e.g., by value or traditional model/algorithm). If the output is likely wrong, an inference host may switch to a traditional model/algorithm instead.

According to aspects of the present disclosure, during a model status monitoring phase, machine learning model outage detection is performed for a machine learning model for wireless communications. In response to a detected model outage, steps are taken to maintain a wireless communication link. In these aspects of the present disclosure, a user equipment (UE) communicates with a network based on a machine learning model for wireless communication. During communication, a status of the machine learning model for wireless communication is monitored. This method includes reporting the status of the machine learning model for wireless communication using a predetermined resource according to a predetermined format. In these aspects of the present disclosure, the method includes falling back to communicating with another technique, instead of the machine learning model for wireless communication, to maintain wireless communication with the network in response to the status of the machine learning model indicating a model failure. Although the present description refers to model 'failure,' and model variation may be reported. The reporting is not limited to model failure.

FIG. 1 is a diagram illustrating a network 100 in which aspects of the present disclosure may be practiced. The network 100 may be a 5G or NR network or some other wireless network, such as an LTE network. The wireless network 100 may include a number of BSs 110 (shown as BS 110*a*, BS 110*b*, BS 110*c*, and BS 110*d*) and other network entities. A BS is an entity that communicates with user equipment (UEs) and may also be referred to as a base station, a NR BS, a Node B, a gNB, a 5G node B (NB), an access point, a transmit and receive point (TRP), and/or the like. Each BS may provide communications coverage for a particular geographic area. In 3GPP, the term "cell" can refer to a coverage area of a BS and/or a BS subsystem serving this coverage area, depending on the context in which the term is used.

A BS may provide communications coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). A BS for a macro cell may be referred to as a macro BS. A BS for a pico cell may be referred to as a pico BS. A BS for a femto cell may be referred to as a femto BS or a home BS. In the example shown in FIG. 1, a BS 110*a* may be a macro BS for a macro cell 102*a*, a BS 110*b* may be a pico BS for a pico cell 102*b*, and a BS 110*c* may be a femto BS for a femto cell 102*c*. A BS may support one or multiple (e.g., three) cells. The terms "eNB," "base station," "NR BS," "gNB," "TRP," "AP," "node B," "5G NB," and "cell" may be used interchangeably.

In some aspects, a cell may not necessarily be stationary, and the geographic area of the cell may move according to the location of a mobile BS. In some aspects, the BSs may be interconnected to one another and/or to one or more other BSs or network nodes (not shown) in the wireless network 100 through various types of backhaul interfaces such as a direct physical connection, a virtual network, and/or the like using any suitable transport network.

The wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay station 110*d* may communicate with macro BS 110*a* and a UE 120*d* in order to facilitate communications between the BS 110*a* and UE 120*d*. A relay station may also be referred to as a relay BS, a relay base station, a relay, and/or the like.

The wireless network 100 may be a heterogeneous network that includes BSs of different types, e.g., macro BSs, pico BSs, femto BSs, relay BSs, and/or the like. These different types of BSs may have different transmit power levels, different coverage areas, and different impact on interference in the wireless network 100. For example, macro BSs may have a high transmit power level (e.g., 5 to 40 Watts) whereas pico BSs, femto BSs, and relay BSs may have lower transmit power levels (e.g., 0.1 to 2 Watts).

A network controller 130 may couple to a set of BSs and may provide coordination and control for these BSs. The network controller 130 may communicate with the BSs via a backhaul. The BSs may also communicate with one another, e.g., directly or indirectly via a wireless or wireline backhaul.

UEs 120 (e.g., 120*a*, 120*b*, 120*c*) may be dispersed throughout the wireless network 100, and each UE may be stationary or mobile. A UE may also be referred to as an access terminal, a terminal, a mobile station, a subscriber unit, a station, and/or the like. A UE may be a cellular phone (e.g., a smart phone), a personal digital assistant (PDA), a wireless modem, a wireless communications device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

The UEs 120 may include a model outage block 140. For brevity, only one UE 120*d* is shown as including the model outage block 140. The model outage block 140 may report a status of the machine learning model for wireless communication using a predetermined resource according to a predetermined format. The model outage block 140 may fall back to communicating with a fallback procedure, instead of the machine learning model for wireless communication, to maintain wireless communication with a network in response to a status of the machine learning model indicating a model failure.

The base stations 110 may include a model configuration block 150. For brevity, only one base station 110*a* is shown as including the model configuration block 150. The model configuration block 150 may provide a predetermined resource and a predetermined format to the UEs 120 for reporting a status of the machine learning model for wireless communication. The model configuration block 150 may provide a fallback procedure to the UEs 120 to maintain wireless communication with a network in response to a status of the machine learning model indicating a model failure.

Some UEs may be considered machine-type communications (MTC) or evolved or enhanced machine-type communications (eMTC) UEs. MTC and eMTC UEs include, for example, robots, drones, remote devices, sensors, meters, monitors, location tags, and/or the like, that may communicate with a base station, another device (e.g., remote device), or some other entity. A wireless node may provide, for example, connectivity for or to a network (e.g., a wide area network such as Internet or a cellular network) via a wired or wireless communications link. Some UEs may be considered Internet-of-Things (IoT) devices, and/or may be implemented as NB-IoT (narrowband internet of things) devices. Some UEs may be considered a customer premises equipment (CPE). UE 120 may be included inside a housing that houses components of UE 120, such as processor components, memory components, and/or the like.

In general, any number of wireless networks may be deployed in a given geographic area. Each wireless network may support a particular RAT and may operate on one or more frequencies. A RAT may also be referred to as a radio technology, an air interface, and/or the like. A frequency may also be referred to as a carrier, a frequency channel, and/or the like. Each frequency may support a single RAT in a given geographic area in order to avoid interference between wireless networks of different RATs. In some cases, NR or 5G RAT networks may be deployed.

In some aspects, two or more UEs 120 (e.g., shown as UE 120*a* and UE 120*e*) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, and/or the like), a mesh network, and/or the like. In this case, the UE 120 may perform scheduling operations, resource selection operations, and/or other operations described elsewhere as being performed by the base station 110. For example, the base station 110 may configure a UE 120 via downlink control information (DCI), radio resource control (RRC) signaling, a media access control-control element (MAC-CE), or via system information (e.g., a system information block (SIB)).

As indicated above, FIG. 1 is provided merely as an example. Other examples may differ from what is described with regard to FIG. 1.

Figure 2:
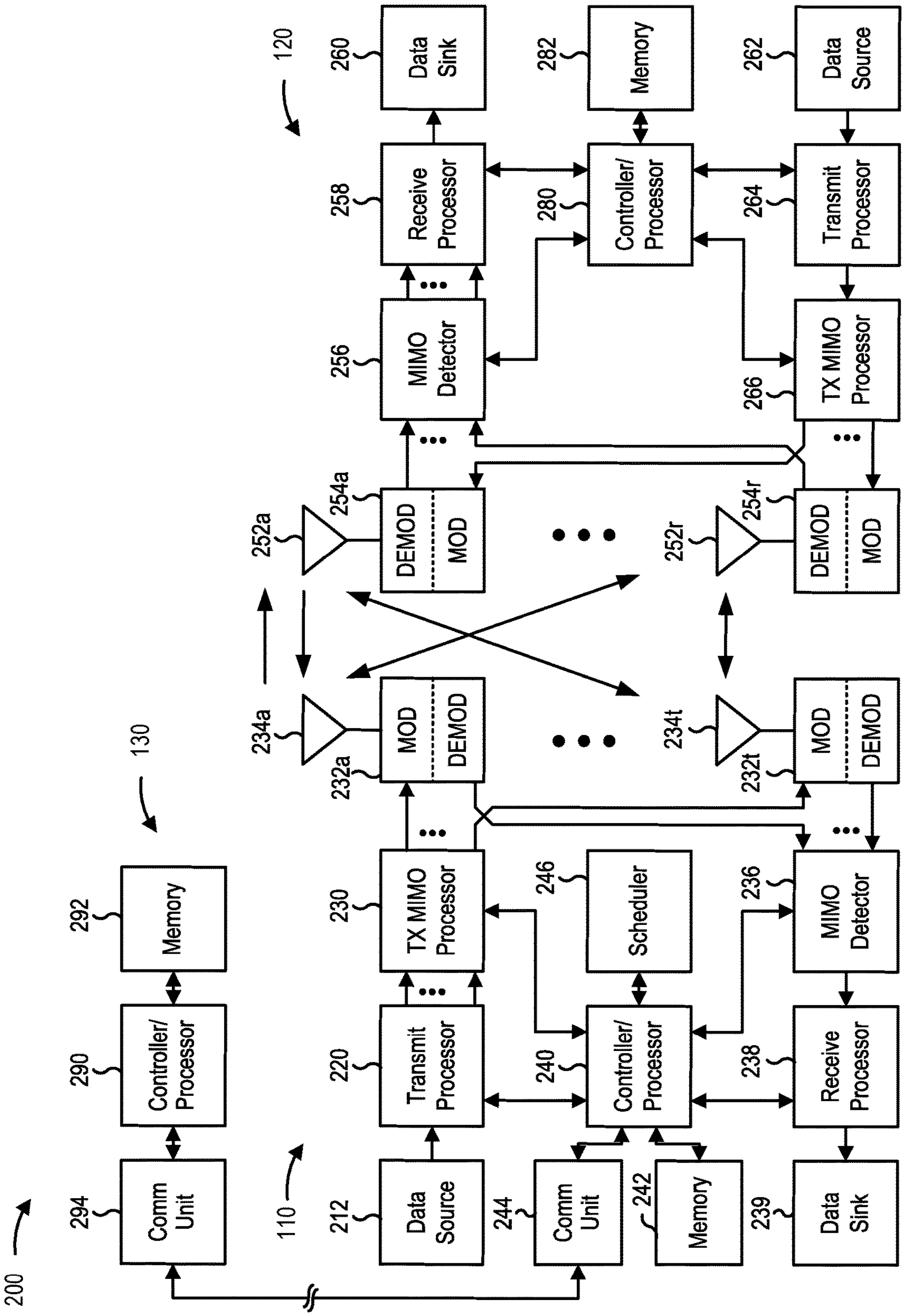
FIG. 2 is a block diagram conceptually illustrating an example of a base station in communication with a user equipment (UE) in a wireless communications network, in accordance with various aspects of the present disclosure.

FIG. 2 shows a block diagram of a design 200 of the base station 110 and UE 120, which may be one of the base stations and one of the UEs in FIG. 1. The base station 110 may be equipped with T antennas 234*a* through 234*t*, and UE 120 may be equipped with R antennas 252*a* through 252*r*, where in general T≥1 and R≥1.

At the base station 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Decreasing the MCS lowers throughput but increases reliability of the transmission. The transmit processor 220 may also process system information (e.g., for semi-static resource partitioning information (SRPI) and/or the like) and control information (e.g., CQI requests, grants, upper layer signaling, and/or the like) and provide overhead symbols and control symbols. The transmit processor 220 may also generate reference symbols for reference signals (e.g., the cell-specific reference signal (CRS)) and synchronization signals (e.g., the primary synchronization signal (PSS) and secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232*a* through 232*t*. Each modulator 232 may process a respective output symbol stream (e.g., for OFDM and/or the like) to obtain an output sample stream. Each modulator 232 may further process (e.g., convert to analog, amplify, filter, and upconvert) the output sample stream to obtain a downlink signal. T downlink signals from modulators 232*a* through 232*t* may be transmitted via T antennas 234*a* through 234*t*, respectively. According to various aspects described in more detail below, the synchronization signals can be generated with location encoding to convey additional information.

At the UE 120, antennas 252*a* through 252*r* may receive the downlink signals from the base station 110 and/or other base stations and may provide received signals to demodulators (DEMODs) 254*a* through 254*r*, respectively. Each demodulator 254 may condition (e.g., filter, amplify, downconvert, and digitize) a received signal to obtain input samples. Each demodulator 254 may further process the input samples (e.g., for OFDM and/or the like) to obtain received symbols. A MIMO detector 256 may obtain received symbols from all R demodulators 254*a* through 254*r*, perform MIMO detection on the received symbols if applicable, and provide detected symbols. A receive processor 258 may process (e.g., demodulate and decode) the detected symbols, provide decoded data for the UE 120 to a data sink 260, and provide decoded control information and system information to a controller/processor 280. A channel processor may determine reference signal received power (RSRP), received signal strength indicator (RSSI), reference signal received quality (RSRQ), channel quality indicator (CQI), and/or the like. In some aspects, one or more components of the UE 120 may be included in a housing.

On the uplink, at the UE 120, a transmit processor 264 may receive and process data from a data source 262 and control information (e.g., for reports comprising RSRP, RSSI, RSRQ, CQI, and/or the like) from the controller/processor 280. Transmit processor 264 may also generate reference symbols for one or more reference signals. The symbols from the transmit processor 264 may be precoded by a TX MIMO processor 266 if applicable, further processed by modulators **254*a* through 254*r* (e.g., for DFT-s-OFDM, CP-OFDM, and/or the like), and transmitted to the base station 110. At the base station 110, the uplink signals from the UE 120 and other UEs may be received by the antennas 234, processed by the demodulators 254, detected by a MIMO detector 236 if applicable, and further processed by a receive processor 238 to obtain decoded data and control information sent by the UE 120. The receive processor 238 may provide the decoded data to a data sink 239 and the decoded control information to a controller/processor 240. The base station 110 may include communications unit 244 and communicate to the network controller 130 via the communications unit 244. The network controller 130 may include a communications unit 294, a controller/processor 290, and a memory 292**.

The controller/processor 240 of the base station 120, and/or the controller/processor 280 of the UE 120 of FIG. 2 may perform one or more techniques associated with machine learning for predicting location-based downlink interference assistance information for the UE 120, as described in more detail elsewhere. For example, the controller/processor 280 of the UE 120 of FIG. 2 may perform or direct operations of, for example, the processes of FIG. 8 and/or other processes as described. In addition, the controller/processor 240 of the base station 110 of FIG. 2 may perform or direct operations of, for example, the process of FIG. 9 and/or other processes as described. Memories 242 and 282 may store data and program codes for the base station 110 and UE 120, respectively. A scheduler 246 may schedule UEs for data transmission on the downlink and/or uplink.

In some aspects, the UE 120 may include means for communicating, means for monitoring, means for reporting, and/or means for falling back. In some aspects, the base station 110 may include means for communicating, means for receiving, and/or means for indicating. Such means may include one or more components of the UE 120 or base station 110 described in connection with FIG. 2.

As indicated above, FIG. 2 is provided merely as an example. Other examples may differ from what is described with regard to FIG. 2.

In some cases, different types of devices supporting different types of applications and/or services may coexist in a cell. Examples of different types of devices include UE handsets, customer premises equipment (CPEs), vehicles, Internet of Things (IoT) devices, and/or the like. Examples of different types of applications include ultra-reliable low-latency communications (URLLC) applications, massive machine-type communications (mMTC) applications, enhanced mobile broadband (eMBB) applications, vehicle-to-everything (V2X) applications, and/or the like. Furthermore, in some cases, a single device may support different applications or services simultaneously.

Figure 3:
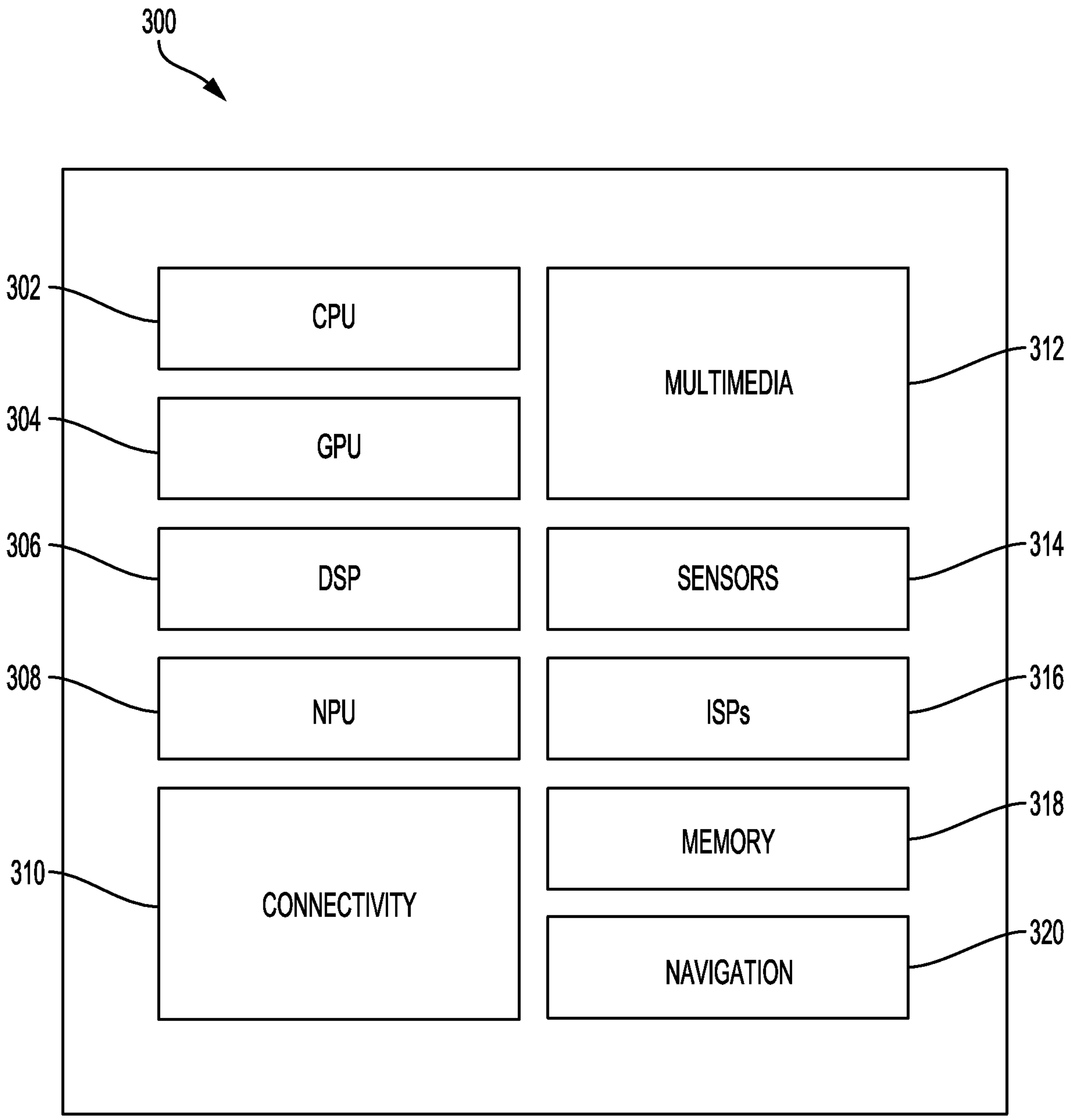
FIG. 3 illustrates an example implementation of designing a neural network using a system-on-a-chip (SOC), including a general-purpose processor, in accordance with certain aspects of the present disclosure.

FIG. 3 illustrates an example implementation of a system-on-a-chip (SOC) 300, which may include a central processing unit (CPU) 302 or a multi-core CPU configured for generating gradients for neural network training, in accordance with certain aspects of the present disclosure. The SOC 300 may be included in the base station 110 or UE 120. Variables (e.g., neural signals and synaptic weights), system parameters associated with a computational device (e.g., neural network with weights), delays, frequency bin information, and task information may be stored in a memory block associated with a neural processing unit (NPU) 308, in a memory block associated with a CPU 302, in a memory block associated with a graphics processing unit (GPU) 304, in a memory block associated with a digital signal processor (DSP) 306, in a memory block 318, or may be distributed across multiple blocks. Instructions executed at the CPU 302 may be loaded from a program memory associated with the CPU 302 or may be loaded from a memory block 318.

The SOC 300 may also include additional processing blocks tailored to specific functions, such as a GPU 304, a DSP 306, a connectivity block 310, which may include fifth generation (5G) connectivity, fourth generation long term evolution (4G LTE) connectivity, Wi-Fi connectivity, USB connectivity, Bluetooth connectivity, and the like, and a multimedia processor 312 that may, for example, detect and recognize gestures. In one implementation, the NPU is implemented in the CPU, DSP, and/or GPU. The SOC 300 may also include a sensor processor 314, image signal processors (ISPs) 316, and/or navigation module 320, which may include a global positioning system.

The SOC 300 may be based on an ARM instruction set. In an aspect of the present disclosure, the instructions loaded into the general-purpose processor 302 may comprise program code to communicate with a network based on a machine learning model for wireless communication, program code to monitor a status of the machine learning model for wireless communication, program code to report the status of the machine learning model for wireless communication using a predetermined resource according to a predetermined format, and/or program code to fall back to communicating with a fallback procedure, instead of the machine learning model for wireless communication, to maintain wireless communication with the network in response to the status of the machine learning model indicating a model failure.

Deep learning architectures may perform an object recognition task by learning to represent inputs at successively higher levels of abstraction in each layer, thereby building up a useful feature representation of the input data. In this way, deep learning addresses a major bottleneck of traditional machine learning. Prior to the advent of deep learning, a machine learning approach to an object recognition problem may have relied heavily on human engineered features, perhaps in combination with a shallow classifier. A shallow classifier may be a two-class linear classifier, for example, in which a weighted sum of the feature vector components may be compared with a threshold to predict to which class the input belongs. Human engineered features may be templates or kernels tailored to a specific problem domain by engineers with domain expertise. Deep learning architectures, in contrast, may learn to represent features that are similar to what a human engineer might design, but through training.

Furthermore, a deep network may learn to represent and recognize new types of features that a human might not have considered.

A deep learning architecture may learn a hierarchy of features. If presented with visual data, for example, the first layer may learn to recognize relatively simple features, such as edges, in the input stream. In another example, if presented with auditory data, the first layer may learn to recognize spectral power in specific frequencies. The second layer, taking the output of the first layer as input, may learn to recognize combinations of features, such as simple shapes for visual data or combinations of sounds for auditory data. For instance, higher layers may learn to represent complex shapes in visual data or words in auditory data. Still higher layers may learn to recognize common visual objects or spoken phrases.

Deep learning architectures may perform especially well when applied to problems that have a natural hierarchical structure. For example, the classification of motorized vehicles may benefit from first learning to recognize wheels, windshields, and other features. These features may be combined at higher layers in different ways to recognize cars, trucks, and airplanes.

Neural networks may be designed with a variety of connectivity patterns. In feed-forward networks, information is passed from lower to higher layers, with each neuron in a given layer communicating to neurons in higher layers. A hierarchical representation may be built up in successive layers of a feed-forward network, as described above. Neural networks may also have recurrent or feedback (also called top-down) connections. In a recurrent connection, the output from a neuron in a given layer may be communicated to another neuron in the same layer. A recurrent architecture may be helpful in recognizing patterns that span more than one of the input data chunks that are delivered to the neural network in a sequence. A connection from a neuron in a given layer to a neuron in a lower layer is called a feedback (or top-down) connection. A network with many feedback connections may be helpful when the recognition of a high-level concept may aid in discriminating the particular low-level features of an input.

Figure 4A:
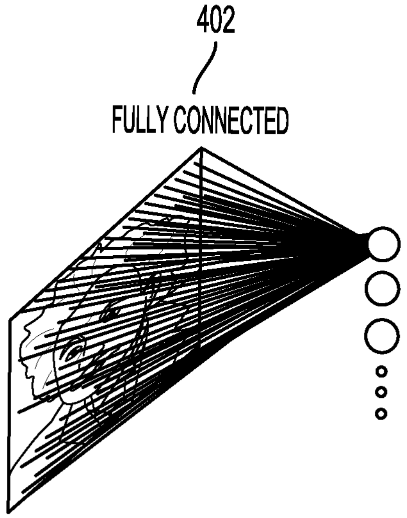
FIGS. 4A, 4B, and 4C are diagrams illustrating a neural network, in accordance with aspects of the present disclosure.
Figure 4B:
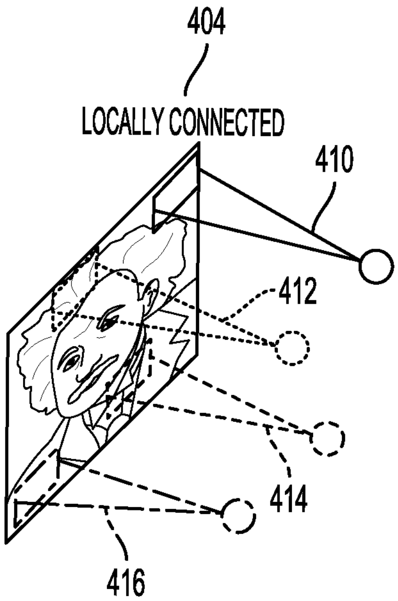

The connections between layers of a neural network may be fully connected or locally connected. FIG. 4A illustrates an example of a fully connected neural network 402. In a fully connected neural network 402, a neuron in a first layer may communicate its output to every neuron in a second layer, so that each neuron in the second layer will receive input from every neuron in the first layer. FIG. 4B illustrates an example of a locally connected neural network 404. In a locally connected neural network 404, a neuron in a first layer may be connected to a limited number of neurons in the second layer. More generally, a locally connected layer of the locally connected neural network 404 may be configured so that each neuron in a layer will have the same or a similar connectivity pattern, but with connections strengths that may have different values (e.g., 410, 412, 414, and 416). The locally connected connectivity pattern may give rise to spatially distinct receptive fields in a higher layer, because the higher layer neurons in a given region may receive inputs that are tuned through training to the properties of a restricted portion of the total input to the network.

Figure 4C:
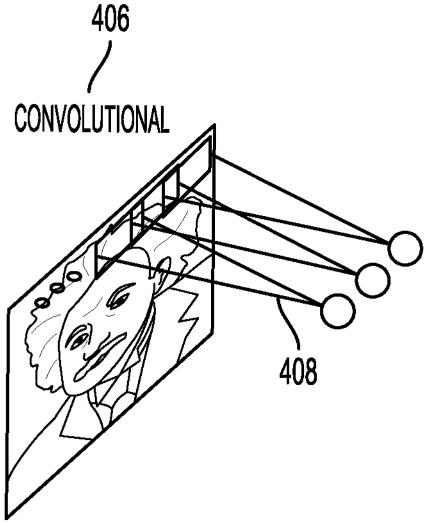

One example of a locally connected neural network is a convolutional neural network. FIG. 4C illustrates an example of a convolutional neural network 406. The convolutional neural network 406 may be configured such that the connection strengths associated with the inputs for each neuron in the second layer are shared (e.g., 408). Convolutional neural networks may be well suited to problems in which the spatial location of inputs is meaningful.

Figure 4D:
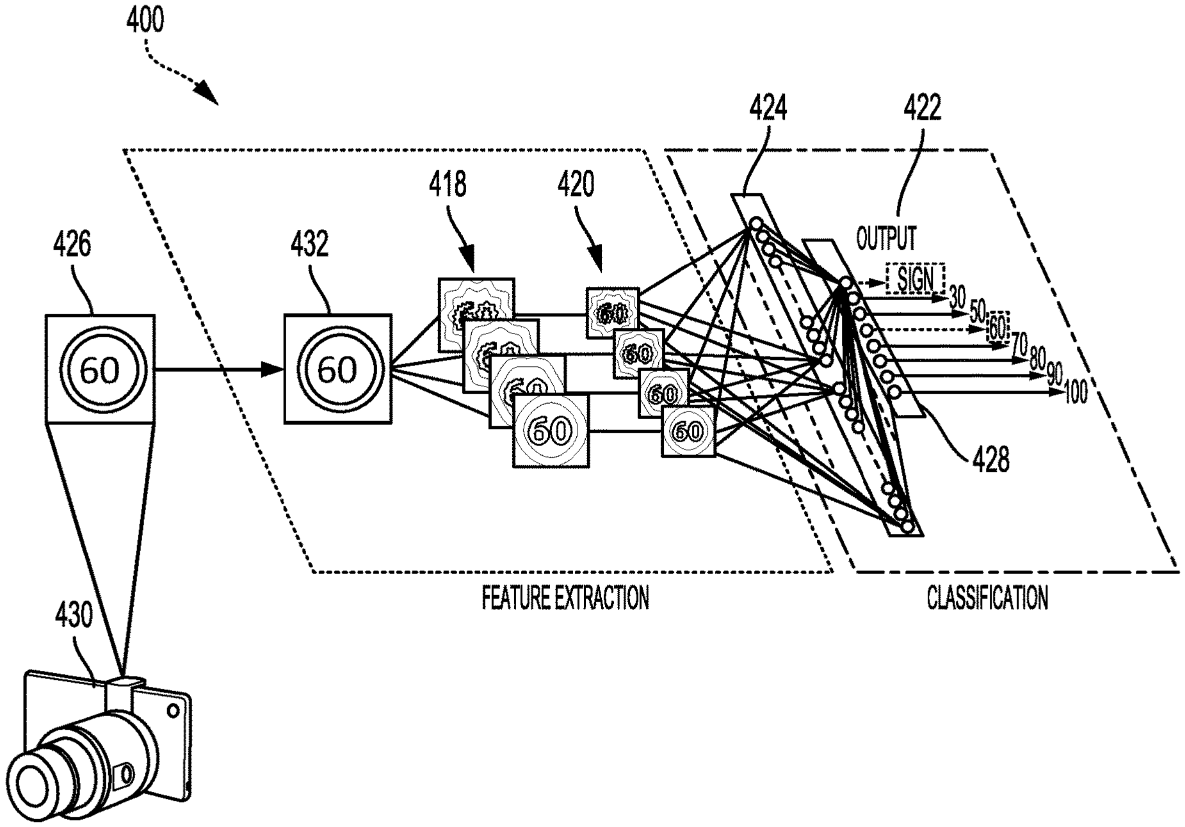
FIG. 4D is a diagram illustrating an exemplary deep convolutional network (DCN), in accordance with aspects of the present disclosure.

One type of convolutional neural network is a deep convolutional network (DCN). FIG. 4D illustrates a detailed example of a DCN 400 designed to recognize visual features from an image 426 input from an image capturing device 430, such as a car-mounted camera. The DCN 400 of the current example may be trained to identify traffic signs and a number provided on the traffic sign. Of course, the DCN 400 may be trained for other tasks, such as identifying lane markings or identifying traffic lights.

The DCN 400 may be trained with supervised learning. During training, the DCN 400 may be presented with an image, such as the image 426 of a speed limit sign, and a forward pass may then be computed to produce an output 422. The DCN 400 may include a feature extraction section and a classification section. Upon receiving the image 426, a convolutional layer 432 may apply convolutional kernels (not shown) to the image 426 to generate a first set of feature maps 418. As an example, the convolutional kernel for the convolutional layer 432 may be a 5×5 kernel that generates 28×28 feature maps. In the present example, because four different feature maps are generated in the first set of feature maps 418, four different convolutional kernels were applied to the image 426 at the convolutional layer 432. The convolutional kernels may also be referred to as filters or convolutional filters.

The first set of feature maps 418 may be subsampled by a max pooling layer (not shown) to generate a second set of feature maps 420. The max pooling layer reduces the size of the first set of feature maps 418. That is, a size of the second set of feature maps 420, such as 14×14, is less than the size of the first set of feature maps 418, such as 28×28. The reduced size provides similar information to a subsequent layer while reducing memory consumption. The second set of feature maps 420 may be further convolved via one or more subsequent convolutional layers (not shown) to generate one or more subsequent sets of feature maps (not shown).

In the example of FIG. 4D, the second set of feature maps 420 is convolved to generate a first feature vector 424. Furthermore, the first feature vector 424 is further convolved to generate a second feature vector 428. Each feature of the second feature vector 428 may include a number that corresponds to a possible feature of the image 426, such as "sign," "60," and "100." A softmax function (not shown) may convert the numbers in the second feature vector 428 to a probability. As such, an output 422 of the DCN 400 is a probability of the image 426 including one or more features.

In the present example, the probabilities in the output 422 for "sign" and "60" are higher than the probabilities of the others of the output 422, such as "30," "40," "50," "70," "80," "90," and "100". Before training, the output 422 produced by the DCN 400 is likely to be incorrect. Thus, an error may be calculated between the output 422 and a target output. The target output is the ground truth of the image 426 (e.g., "sign" and "60"). The weights of the DCN 400 may then be adjusted so the output 422 of the DCN 400 is more closely aligned with the target output.

To adjust the weights, a learning algorithm may compute a gradient vector for the weights. The gradient may indicate an amount that an error would increase or decrease if the weight were adjusted. At the top layer, the gradient may correspond directly to the value of a weight connecting an activated neuron in the penultimate layer and a neuron in the output layer. In lower layers, the gradient may depend on the value of the weights and on the computed error gradients of the higher layers. The weights may then be adjusted to reduce the error. This manner of adjusting the weights may be referred to as "back propagation" as it involves a "backward pass" through the neural network.

In practice, the error gradient of weights may be calculated over a small number of examples, so that the calculated gradient approximates the true error gradient. This approximation method may be referred to as stochastic gradient descent. Stochastic gradient descent may be repeated until the achievable error rate of the entire system has stopped decreasing or until the error rate has reached a target level. After learning, the DCN may be presented with new images (e.g., the speed limit sign of the image 426) and a forward pass through the network may yield an output 422 that may be considered an inference or a prediction of the DCN.

Deep belief networks (DBNs) are probabilistic models comprising multiple layers of hidden nodes. DBNs may be used to extract a hierarchical representation of training data sets. A DBN may be obtained by stacking up layers of Restricted Boltzmann Machines (RBMs). An RBM is a type of artificial neural network that can learn a probability distribution over a set of inputs. Because RBMs can learn a probability distribution in the absence of information about the class to which each input should be categorized, RBMs are often used in unsupervised learning. Using a hybrid unsupervised and supervised paradigm, the bottom RBMs of a DBN may be trained in an unsupervised manner and may serve as feature extractors, and the top RBM may be trained in a supervised manner (on a joint distribution of inputs from the previous layer and target classes) and may serve as a classifier.

Deep convolutional networks (DCNs) are networks of convolutional networks, configured with additional pooling and normalization layers. DCNs have achieved state-of-the-art performance on many tasks. DCNs can be trained using supervised learning in which both the input and output targets are known for many exemplars and are used to modify the weights of the network by use of gradient descent methods.

DCNs may be feed-forward networks. In addition, as described above, the connections from a neuron in a first layer of a DCN to a group of neurons in the next higher layer are shared across the neurons in the first layer. The feed-forward and shared connections of DCNs may be exploited for fast processing. The computational burden of a DCN may be much less, for example, than that of a similarly sized neural network that comprises recurrent or feedback connections.

The processing of each layer of a convolutional network may be considered a spatially invariant template or basis projection. If the input is first decomposed into multiple channels, such as the red, green, and blue channels of a color image, then the convolutional network trained on that input may be considered three-dimensional, with two spatial dimensions along the axes of the image and a third dimension capturing color information. The outputs of the convolutional connections may be considered to form a feature map in the subsequent layer, with each element of the feature map (e.g., 220) receiving input from a range of neurons in the previous layer (e.g., feature maps 218) and from each of the multiple channels. The values in the feature map may be further processed with a non-linearity, such as a rectification, max(0, x). Values from adjacent neurons may be further pooled, which corresponds to down sampling, and may provide additional local invariance and dimensionality reduction. Normalization, which corresponds to whitening, may also be applied through lateral inhibition between neurons in the feature map.

The performance of deep learning architectures may increase as more labeled data points become available or as computational power increases. Modern deep neural networks are routinely trained with computing resources that are thousands of times greater than what was available to a typical researcher just fifteen years ago. New architectures and training paradigms may further boost the performance of deep learning. Rectified linear units may reduce a training issue known as vanishing gradients. New training techniques may reduce over-fitting and thus enable larger models to achieve better generalization. Encapsulation techniques may abstract data in a given receptive field and further boost overall performance.

Figure 5:
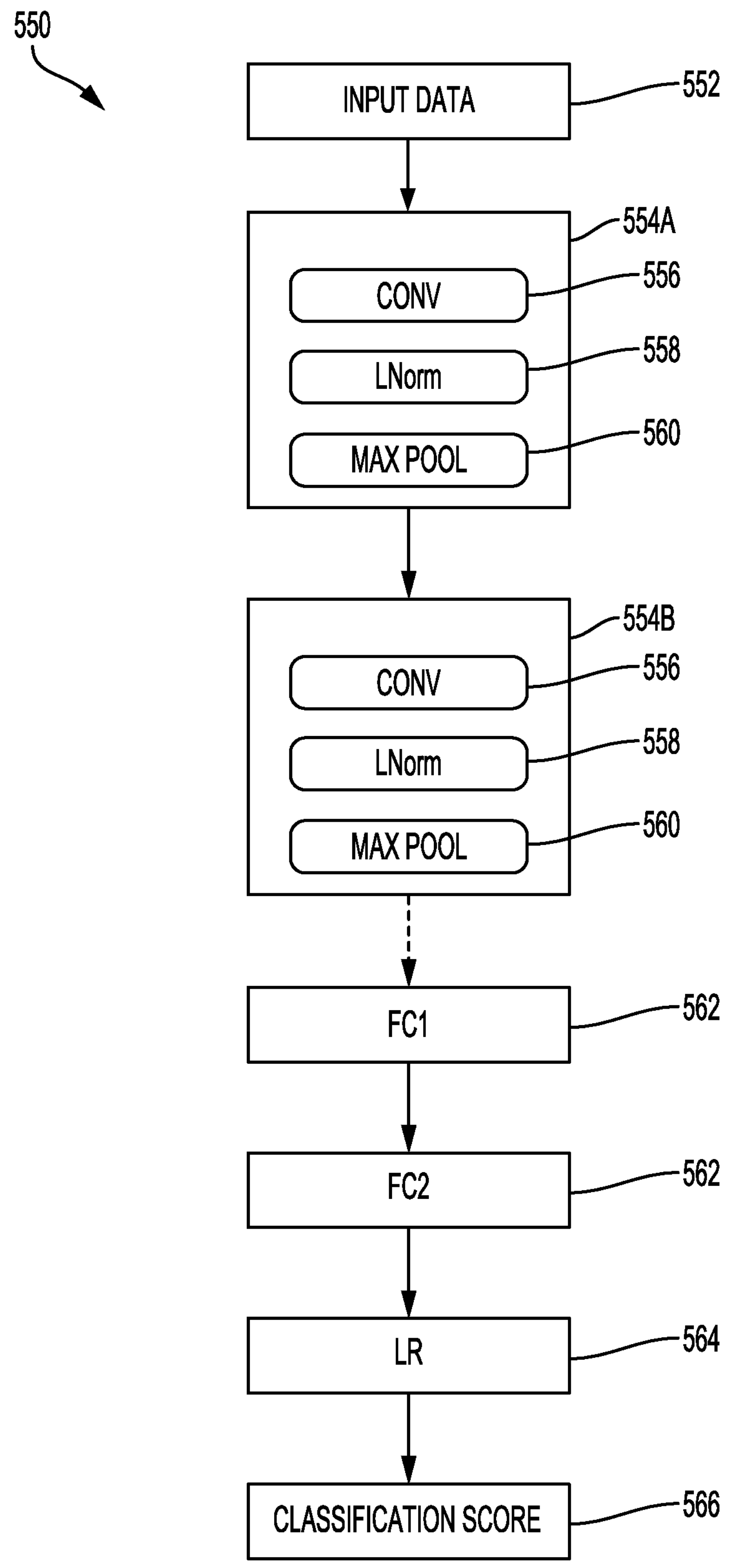
FIG. 5 is a block diagram illustrating an exemplary deep convolutional network (DCN), in accordance with aspects of the present disclosure.

FIG. 5 is a block diagram illustrating a deep convolutional network 550. The deep convolutional network 550 may include multiple different types of layers based on connectivity and weight sharing. As shown in FIG. 5, the deep convolutional network 550 includes the convolution blocks 554A, 554B. Each of the convolution blocks 554A, 554B may be configured with a convolution layer (CONV) 356, a normalization layer (LNorm) 558, and a max pooling layer (MAX POOL) 560.

The convolution layers 556 may include one or more convolutional filters, which may be applied to the input data to generate a feature map. Although only two of the convolution blocks 554A, 554B are shown, the present disclosure is not so limiting, and instead, any number of the convolution blocks 554A, 554B may be included in the deep convolutional network 550 according to design preference. The normalization layer 558 may normalize the output of the convolution filters. For example, the normalization layer 558 may provide whitening or lateral inhibition. The max pooling layer 560 may provide down sampling aggregation over space for local invariance and dimensionality reduction.

The parallel filter banks, for example, of a deep convolutional network may be loaded on a CPU 302 or GPU 304 of an SOC 300 to achieve high performance and low power consumption. In alternative embodiments, the parallel filter banks may be loaded on the DSP 306 or an ISP 316 of an SOC 300. In addition, the deep convolutional network 550 may access other processing blocks that may be present on the SOC 300, such as sensor processor 314 and navigation module 320, dedicated, respectively, to sensors and navigation.

The deep convolutional network 550 may also include one or more fully connected layers 562 (FC1 and FC2). The deep convolutional network 550 may further include a logistic regression (LR) layer 564. Between each layer 556, 558, 560, 562, 564 of the deep convolutional network 550 are weights (not shown) that are to be updated. The output of each of the layers (e.g., 556, 558, 560, 562, 564) may serve as an input of a succeeding one of the layers (e.g., 556, 558, 560, 562, 564) in the deep convolutional network 550 to learn hierarchical feature representations from input data 552 (e.g., images, audio, video, sensor data and/or other input data) supplied at the first of the convolution blocks 554A. The output of the deep convolutional network 550 is a classification score 566 for the input data 552. The classification score 566 may be a set of probabilities, where each probability is the probability of the input data, including a feature from a set of features.

As indicated above, FIGS. 3-5 are provided as examples. Other examples may differ from what is described with respect to FIGS. 3-5.

As described above, in an artificial intelligence (AI)-based end-to-end (E2E) wireless system, a neural network model for wireless communication may be incorporated within a transmitter (Tx) and a receiver (Rx) of the AI-based E2E wireless system. In some configurations, a transmitter neural network replaces encoding, modulation, and/or precoding components in the transmitter. In addition, a receiver neural network replaces synchronization, channel estimation, detection, demodulation, and/or decoding components in the receiver. In some aspects, the neural network replaces one, some, or all transmitting/receiving modules of the AI-based E2E wireless system. In these aspects of the present disclosure, offline training and online refinement are performed to configure the transmitter neural network(s) and the receiver neural network(s).

Unfortunately, neural network-based machine learning models for wireless communication are less reliable than traditional machine learning models. Machine learning models for wireless communication are generally considered as data-driven solutions. As a result, a quality of the data determines a performance of a machine learning application for wireless communication. Yet realistic deployment environments of machine learning applications for wireless communication may be more complicated than the expected. This may lead to a further performance degradation of the deployed machine learning model.

In particular, during a model preparation stage (e.g., training/validation/testing), a prepared dataset may be unable to cover all of the potential wireless communication scenarios. As a result, a model performance during inference may significantly vary in diverse environments. In practice, a system may monitor a model status and reconfigure the model when performance degrades. Reconfiguration of the model may be performed to provide satisfactory model performance. For example, a machine learning model output may be verified (e.g., by value or traditional model/algorithm). If the output is likely wrong, an inference host uses a traditional model/algorithm instead.

According to aspects of the present disclosure, during a model status monitoring phase, machine learning model outage detection is performed. In response to a detected model outage, steps are taken to maintain a wireless communication link. In these aspects of the present disclosure, a user equipment (UE) communicates with a network based on a machine learning model for wireless communication. During communication, a status of the machine learning model for wireless communication is monitored. This method includes reporting the status of the machine learning model for wireless communication using a predetermined resource according to a predetermined format. In these aspects of the present disclosure, the method includes falling back to communicating with a fallback procedure, instead of the machine learning model for wireless communication, to maintain wireless communication with the network in response to the status of the machine learning model indicating a model failure, for example, as shown in FIG. 6.

Figure 6:
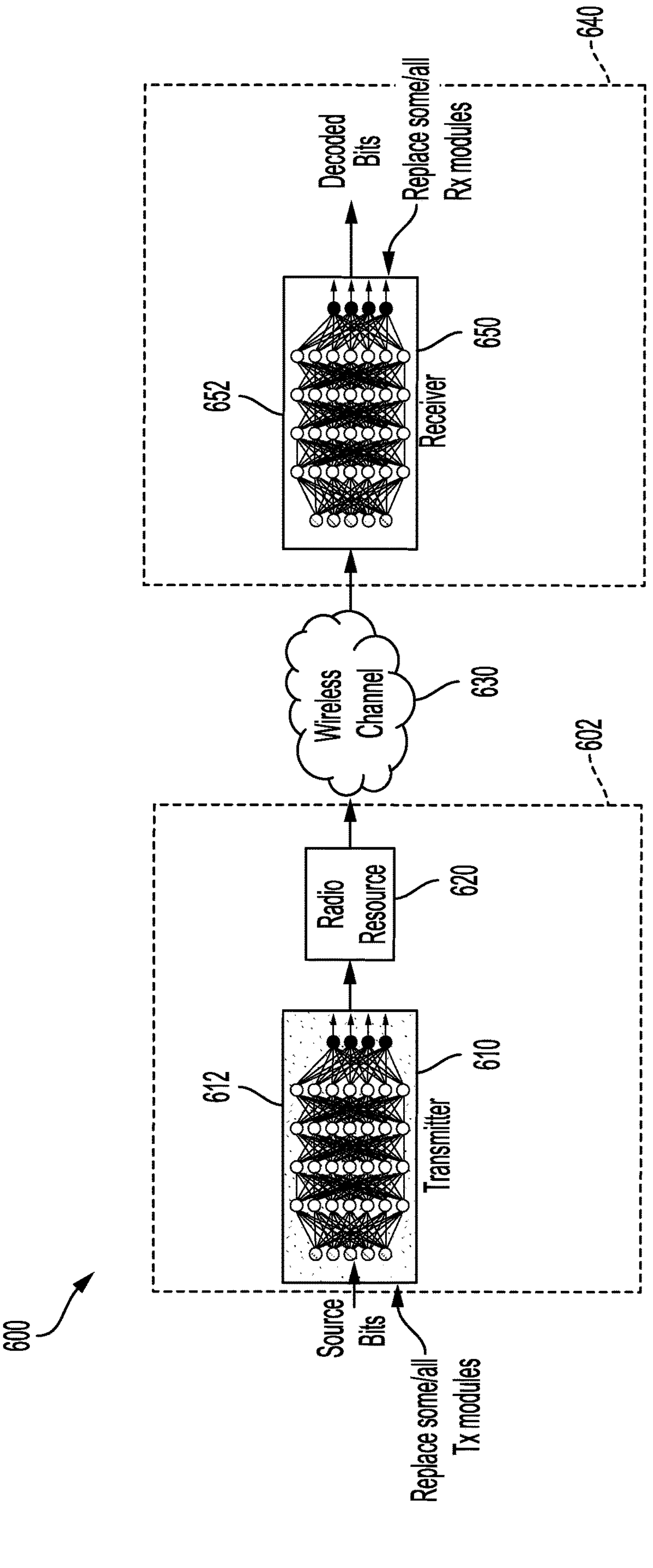
FIG. 6 is a block diagram illustrating an artificial intelligence (AI)-based end-to-end (E2E) wireless system incorporating a neural network model for wireless communication within a transmitter (Tx) and/or a receiver (Rx), according to aspects of the present disclosure.

FIG. 6 is a block diagram illustrating an artificial intelligence (AI)-based end-to-end (E2E) wireless system 600, incorporating neural networks within a transmitter (Tx) 610 and/or a receiver (Rx) 650, according to aspects of the present disclosure. In this example, the AI-based E2E wireless system 600 shows the transmitter 610 of a base station 602 and the receiver 650 of a user equipment (UE) 640. The base station 602 includes a radio resource module 620 communicably coupled to the UE 640 through a wireless channel 630. In this configuration, a neural network (e.g., a transmitter neural network 612) replaces encoding, modulation, and/or precoding modules in the transmitter 610. In addition, a neural network (e.g., a receiver neural network 652) replaces synchronization, channel estimation, detection, demodulation, and/or decoding components in the receiver 650. The transmitter 610 is communicably coupled to the receiver 650 through the wireless channel 630.

Configuration of the neural network parameters of the transmitter 610 and the receiver 650 of the AI-based E2E wireless system 600 may occur, for example, in a 5G NR system. In some aspects, the transmitter neural network 612 and the receiver neural network 652 replace one, some, or all transmitting and receiving modules of the AI-based E2E wireless system 600.

Figure 7A:
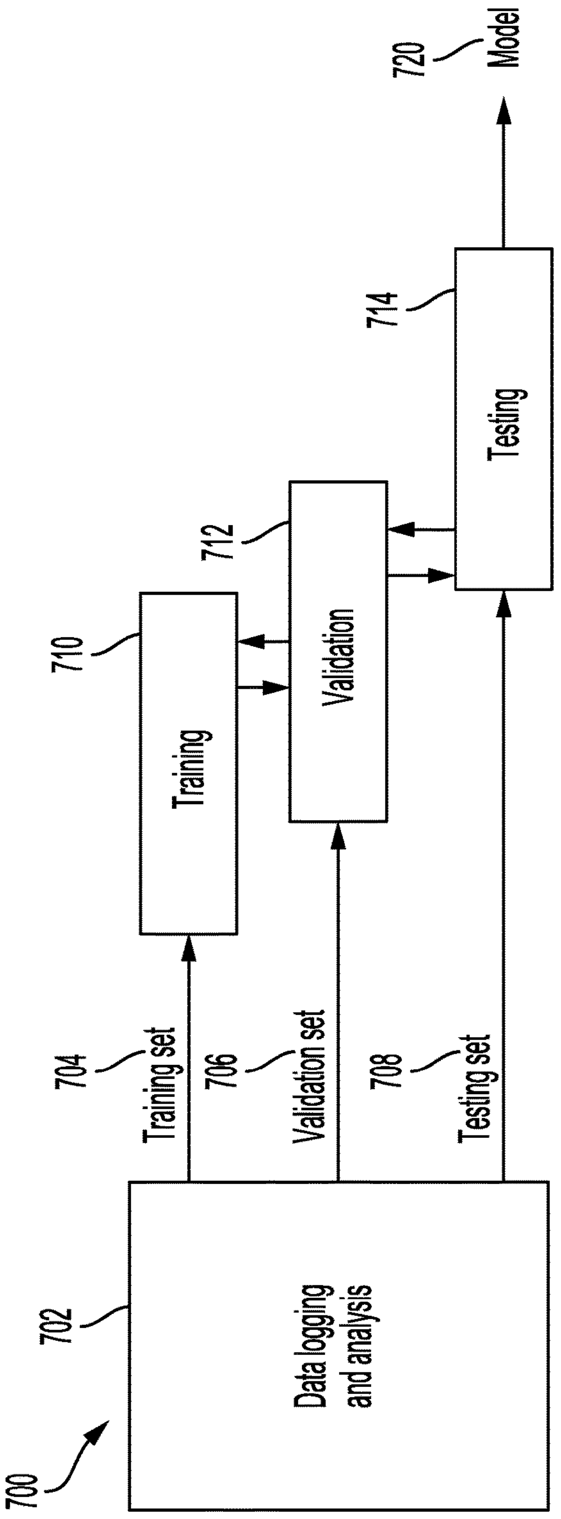
FIGS. 7A and 7B are block diagrams illustrating examples of a machine learning model preparation and a machine learning model deployment.
Figure 7B:
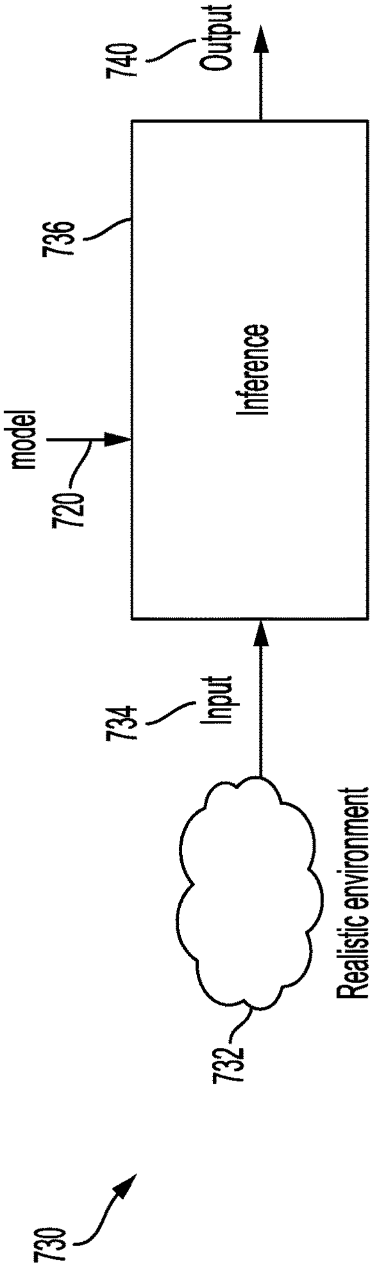

FIGS. 7A and 7B are block diagrams illustrating examples of a machine learning model preparation and a machine learning model deployment, respectively. As noted, artificial intelligence solutions may be data-driven-based, and the application procedure may occur in a two-stage process: model preparation and model deployment. The machine learning model preparation stage may be based on a given dataset, training of the model, validation of the model, and testing of the model.

For example, a diagram 700 of FIG. 7A provides an example of the machine learning model preparation stage. A data logging and analysis module 702 may provide a training set 704 to a training module 710 to train the model. The data logging and analysis module 702 may provide a validation set 706 to a validation module 712 to validate or estimate the performance of the model. The validation or estimation of performance of the model may be based on a training dataset generated by the training module 710, which is provided to the validation module 712 by the training module 710. The data logging and analysis module 702 may provide a testing set 708 to a testing module 714. The testing module 714 may evaluate the performance of a final version of the model 720. The testing module 714 may evaluate a performance of the final version of the model 720 based in part on data from the validation module 712.

FIG. 7B provides a diagram 730 of the machine learning model deployment stage. Once the final version of the model 720 is determined, the model 720 may be provided to an inference module 736 in order to run live data points into the model 720. For example, input 734 from a realistic environment 732 may be input into the inference module 736 to run live data into the model 720, in order to produce an output 740. The output 740 may provide an output score of the performance of the model 720. The output 740 may provide an indication as to performance of the model 720 against realistic data to determine whether the model 720 may produce an output 740 within an expected range or within an in-distribution (ID) space. The realistic data may be unpredictable. The realistic deployment environments may be more complicated than the expected dataset. The pre-logged dataset may not cover all of the potential scenarios, which may occur in realistic data.

Figure 8:
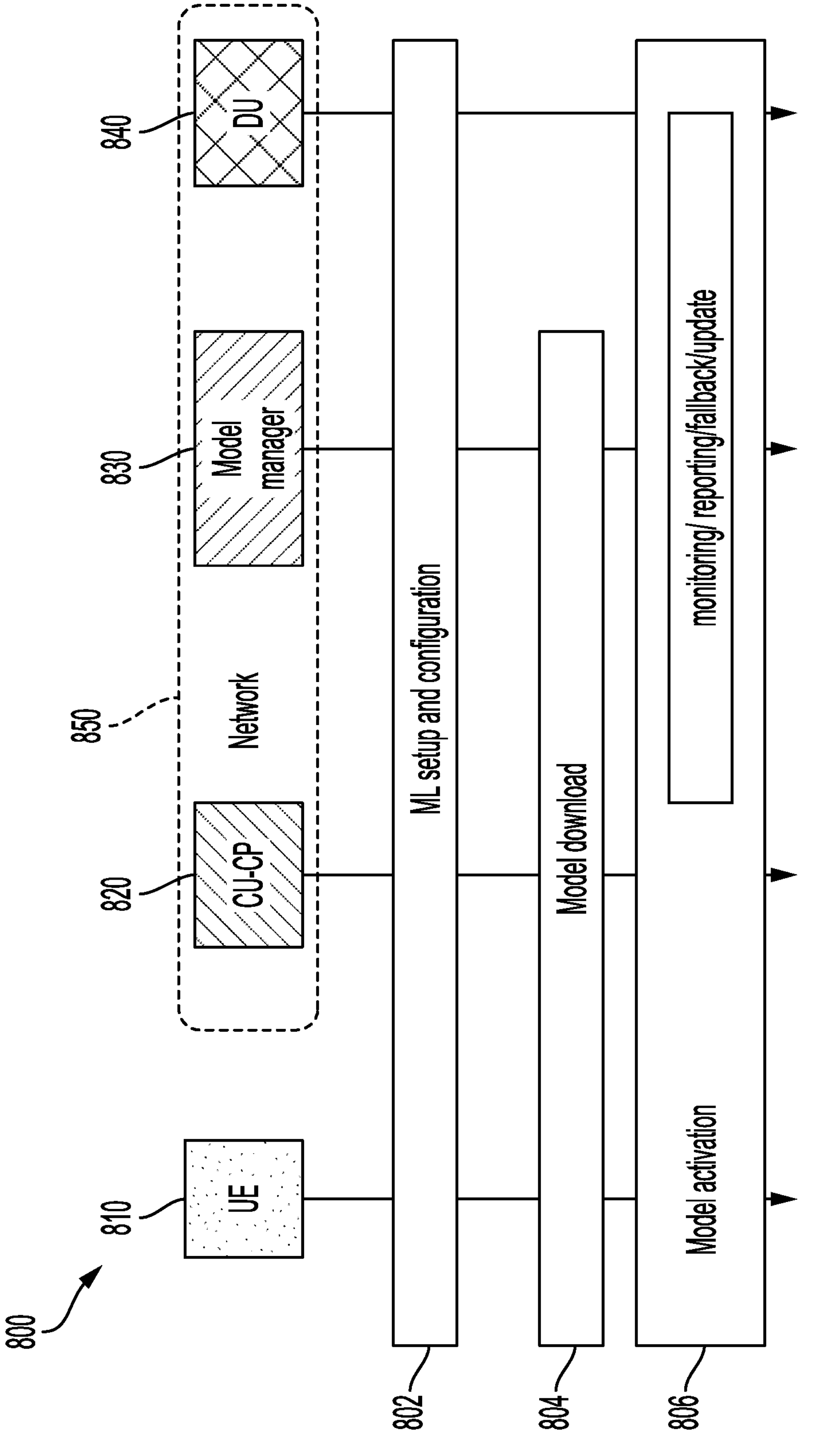
FIG. 8 is a timing diagram illustrating network configuration for model inference of matched machine learning models for wireless communication in a user equipment (UE) and a base station (gNB), according to aspects of the present disclosure.

FIG. 8 is a timing diagram illustrating network configuration for model inference of matched machine learning models for wireless communication in a user equipment (UE) and a network, according to aspects of the present disclosure. FIG. 8 illustrates a machine leaning model configuration process 800 of configuring a model inference scenario in a machine learning model deployment between a user equipment (UE) 810, a centralized unit-control plane (CU-CP) 820, a model manager 830 (e.g., a CU-XP), and a distributed unit (DU) 840. The CU-CP 820, the model manager 830, and the DU 840 may be components of a network 850 (e.g., a base station (gNB) and/or core network).

This machine leaning model configuration process 800 begins at block 802, in which a machine learning setup and configuration are performed. This machine learning setup and configuration of block 802 may specify inference in only the network 850, inference in only the UE 810, or inference in both the UE 810 and the network 850. The machine learning setup of block 802 may configure a neural network function (e.g., Y=F(X). In this example, the function F may be identified by a standardized neural network identifier (NNF-ID), with standardized inputs/output (e.g., X, Y for each neural network function, where X is the input, Y is the output). In particular, the machine learning model is generally composed of a model structure and a parameter set.

At block 804, a model download is performed. Once downloaded, a model activation is performed at block 806. The model download of block 804 and the model activation of block 806 may vary depending on whether the machine learning setup and configuration of block 802 specifies inference in only the network 850, inference in only the UE 810, or inference in both the UE 810 and the network 850. In the model deployment of FIG. 8, there may be instances where one or more samples from a new environment, which may include different features than the dataset, are used in the machine learning preparation stage. In such instances, the one or more samples from the new environment may be out of the distribution (OOD), in comparison to the previous logged dataset within the ID. According to aspects of the present disclosure, the model activation at block 806 may specify monitoring, reporting, fallback, and/or updating of the model in the event of a model failure, as shown in FIGS. 9A and 9B.

Aspects of the present disclosure are directed to a signaling method to track and report a model status of a machine learning model for wireless communication. The signaling method may configure and trigger a reporting procedure both in a user plane (UP) and a control plane (CP). This signaling method may provide a fallback procedure and/or a model update to maintain a communication link between a user equipment and a network. In these aspects of the present disclosure, a network configuration and triggering procedure, a signaling exchange design, and an AI fallback mode maintain basic communication in the event of a model failure.

Figure 14C:
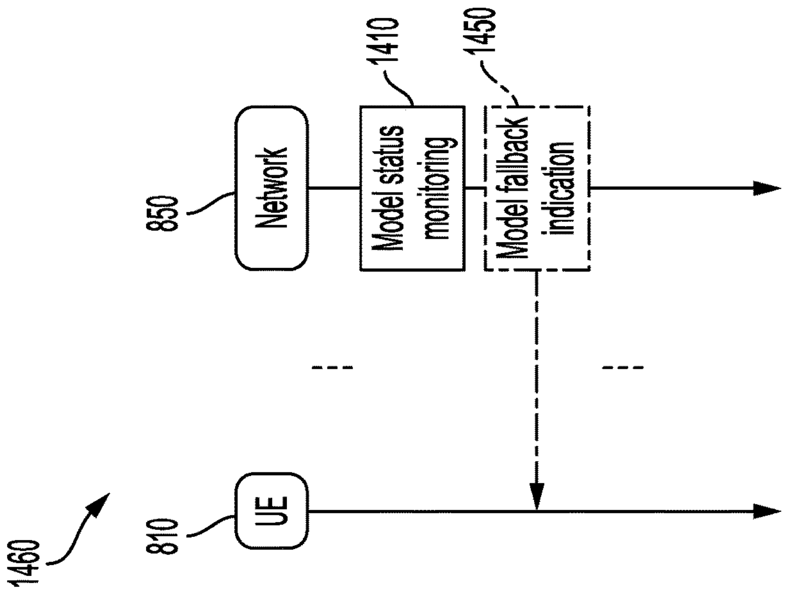
FIGS. 14A-14C are timing diagrams illustrating options to implement a model fallback procedure configured in the event of a model outage detection, according to aspects of the present disclosure.
Figure 14B:
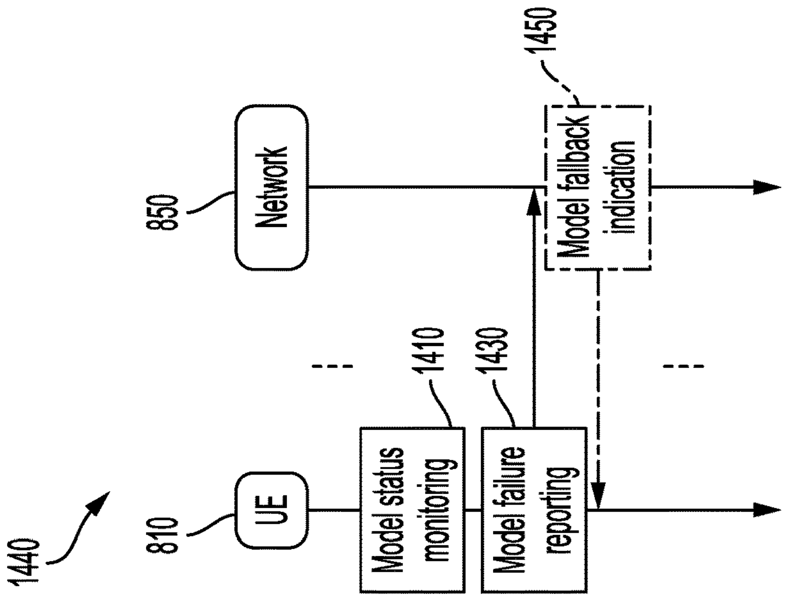
Figure 14A:
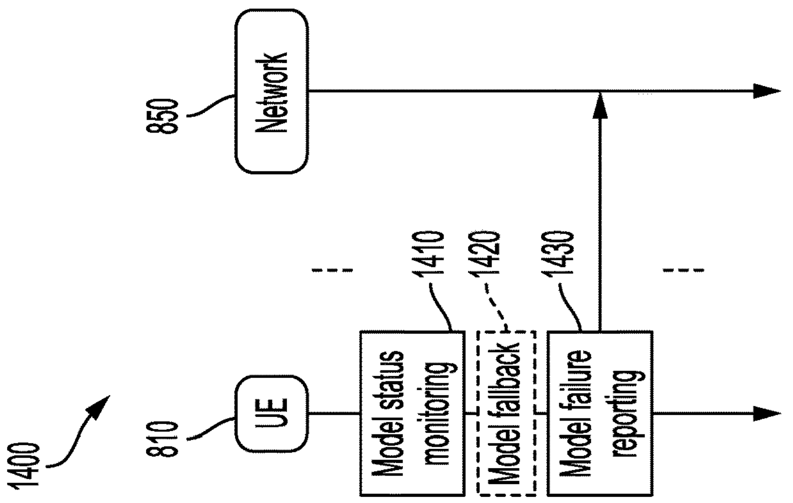
Figure 15B:
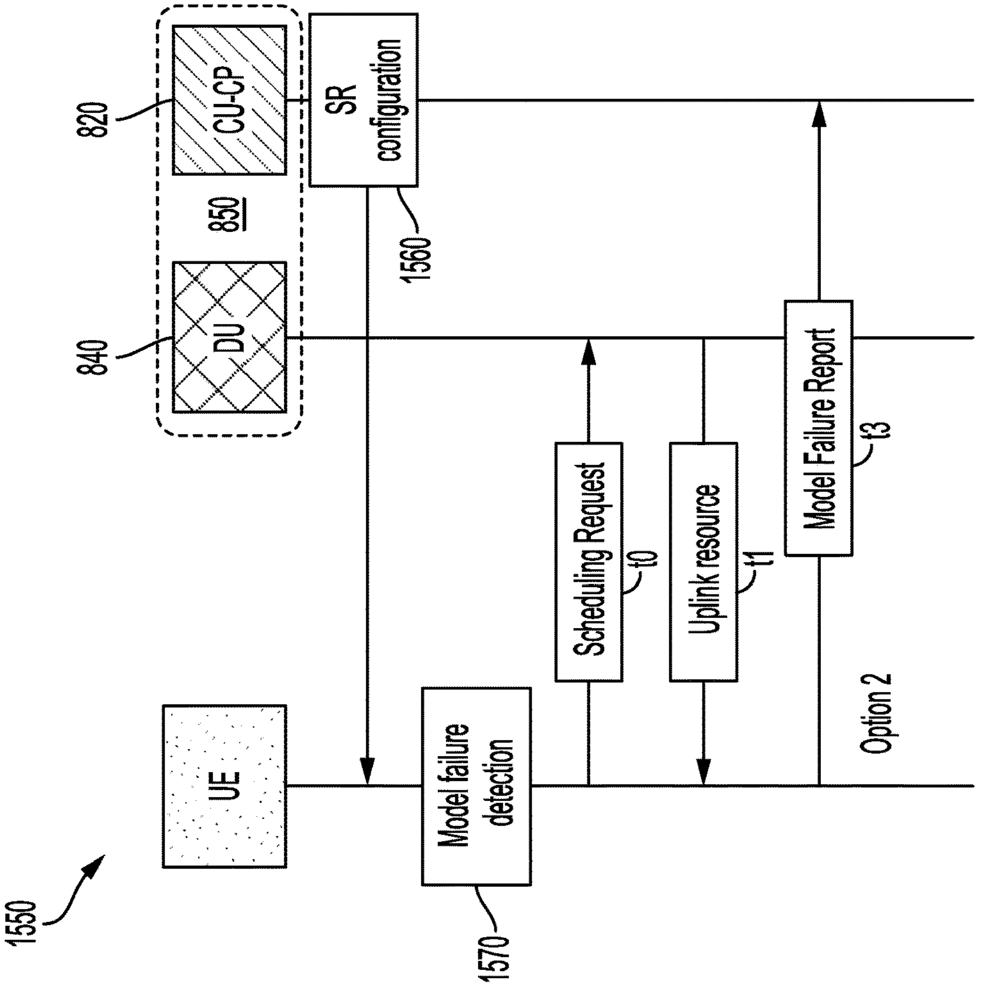
FIGS. 15A and 15B are timing diagrams illustrating processes for machine learning model failure reporting when reporting of model status reports is triggered by a user equipment (UE), according to aspects of the present disclosure.
Figure 15A:
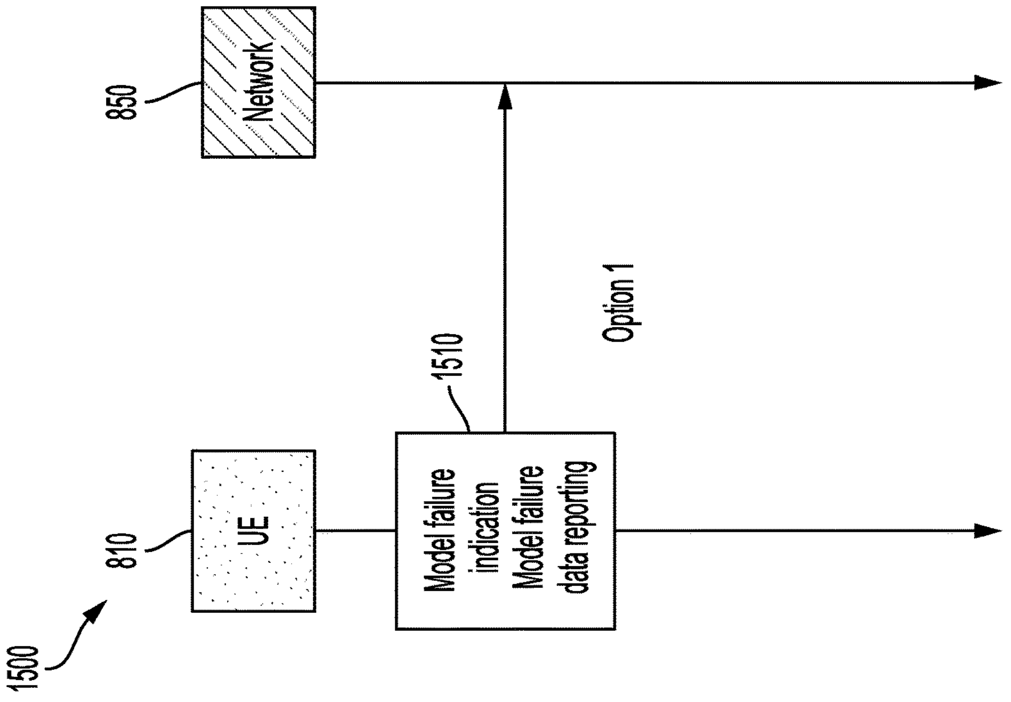
Figure 16A:
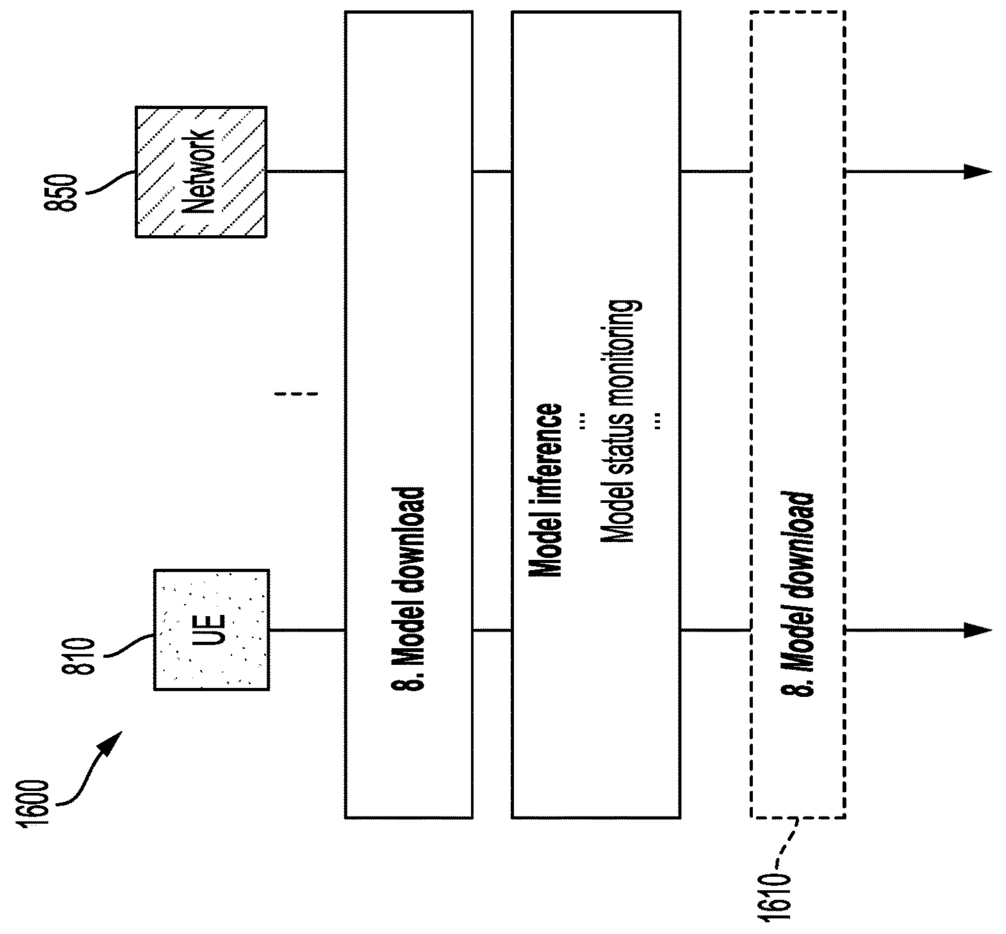
FIGS. 16A and 16B are timing diagrams illustrating a signaling flow among a user equipment (UE) and a network to reconfigure a model in response to reporting of a model status failure, according to aspects of the present disclosure.
Figure 16B:
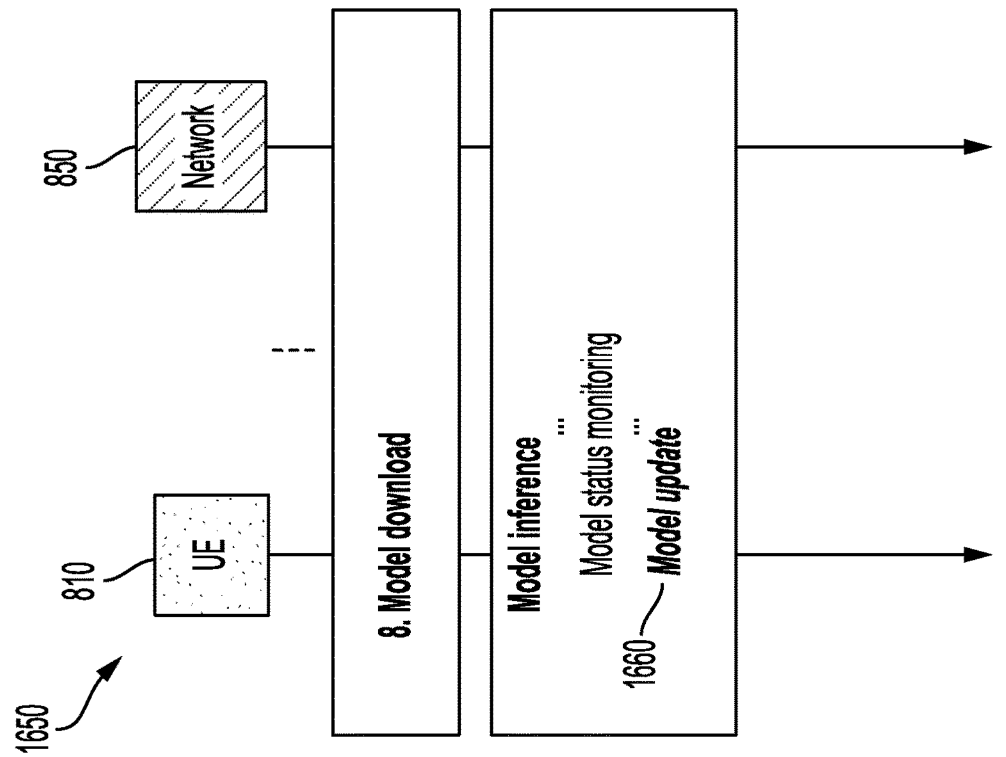

In these aspects of the present disclosure, a model failure reporting procedure may be performed through a user plane (e.g., a UP MAC layer) as well as a control plane (e.g., CP radio resource control (RRC) layer). In some aspects of the present disclosure, each action of the failure reporting procedure is mapped to nodes of an overall machine learning (ML) application. For example, a signaling flow among the network nodes of FIG. 8 may be performed according to a periodic model status failure reporting procedure of FIGS. 9A and 9B, UE triggering of the model status failure reporting of FIG. 12, or network triggering of a UE model status failure reporting procedure of FIG. 13. In some aspects of the present disclosure, a signaling flow among the network nodes to provide a model fallback may be performed as shown in FIGS. 14A-14C. In some aspects, the signaling flow among the network nodes to provide model failure reporting during a UE triggered failure reporting procedure using a scheduling request (SR) may performed as shown in FIGS. 15A and 15B. In addition, the signaling flow among the network nodes to provide network actions for the model update may performed as shown in FIGS. 16A and 16B.

Figure 9A:
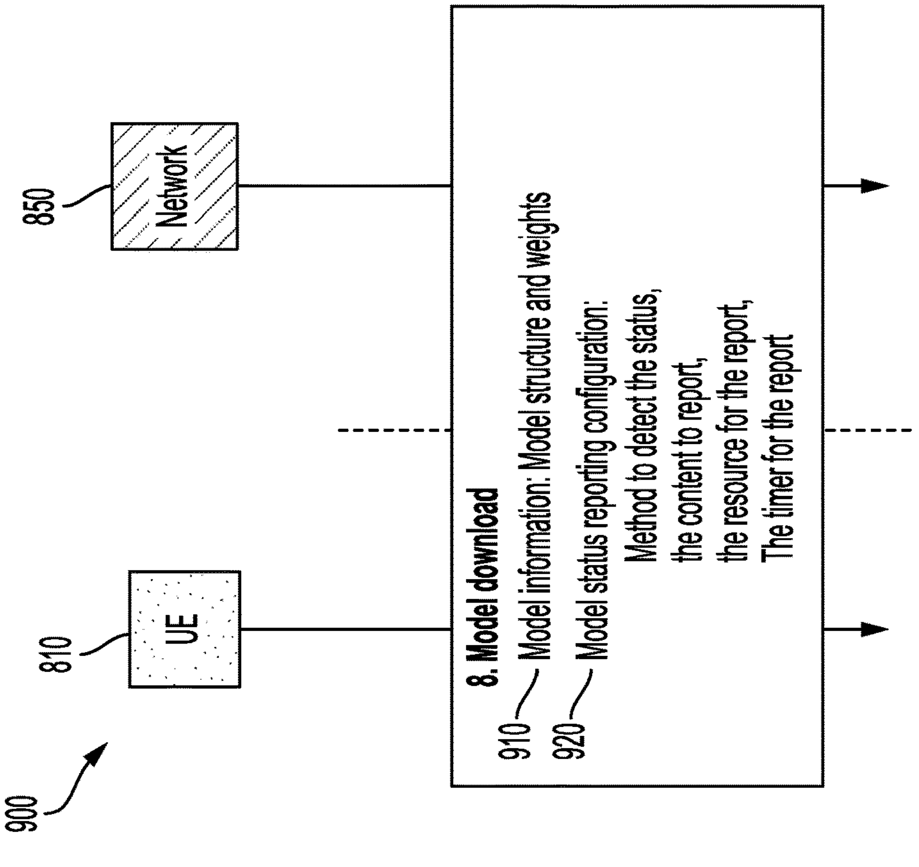
FIGS. 9A and 9B are timing diagrams illustrating a signaling flow among network nodes to perform a periodic model status failure reporting procedure, according to aspects of the present disclosure.
Figure 9B:
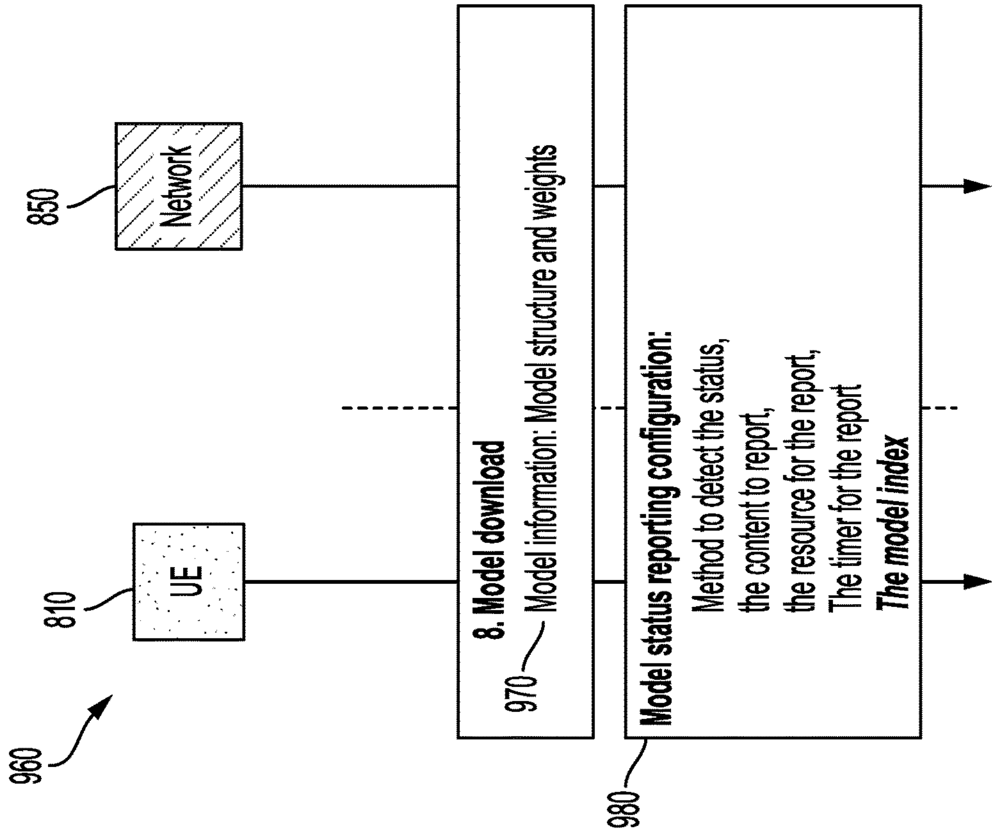

FIGS. 9A and 9B are timing diagrams illustrating a signaling flow among network nodes to perform a periodic model status failure reporting procedure, according to aspects of the present disclosure. In these aspects of the present disclosure, the UE 810 reports a model status as a layer two (L2) or a layer three (L3) measurement when the model inference is configured at the UE 810. Reporting of a model status by the UE 810 may be performed on a periodic basis, or may be timer-based according to a received model status report configuration. According to aspects of the present disclosure, inference may be configured at only the UE 810, or inference may be partially configured at the UE 810. In addition, FIGS. 9A and 9B illustrate options for configuration of the model status report.

FIG. 9A is a timing diagram 900 illustrating a first option for configuration of the model status report. In this example, model information 910 and a model status report configuration 920 are embedded in a model download message received by the UE 810 at block 804 in FIG. 8. In this example, the model status report configuration 920 is associated with one specific machine learning model for wireless communication (e.g., the model information 910). In these aspects of the present disclosure, the model download message is from the network 850 (e.g., the model manager 830) and includes the model information 910 (e.g. the model structure and weights), and the model status report configuration 920. In this example, the model status report configuration 920 includes a method to detect the model status, a content to report, a resource to report, and a timer for the report.

FIG. 9B is a timing diagram 960 illustrating a second option for configuration of the model status report using separate messages. In this example, this separate signaling may indicate one general configuration for all or some machine learning models. Alternatively, this separate signaling may indicate a configuration associated to one specific model. In addition, the configuration may be a static configuration, based on radio resource control (RRC) signaling. In these aspects of the present disclosure, the model download message is from the network 850 (e.g., the model manager 830) and includes model information 970 (e.g. the model structure and weights). In this example, a model status report configuration 980 includes a method to detect the model status, a content to report, a resource to report, and a timer for the report. The separate signaling for this second option may include information bits to indicate a model index that associates the configuration with a particular model.

Figure 10A:
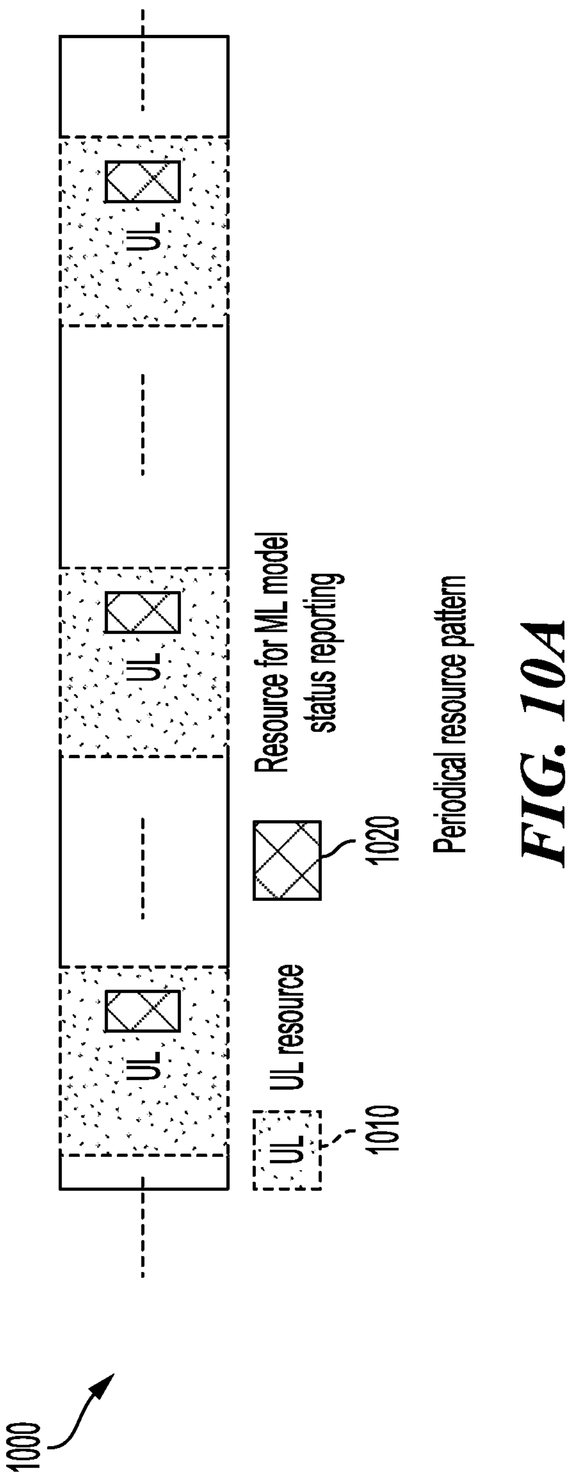
FIGS. 10A and 10B are diagrams illustrating configurations for periodic model status reporting by the UE, according to aspects of the present disclosure.
Figure 10B:
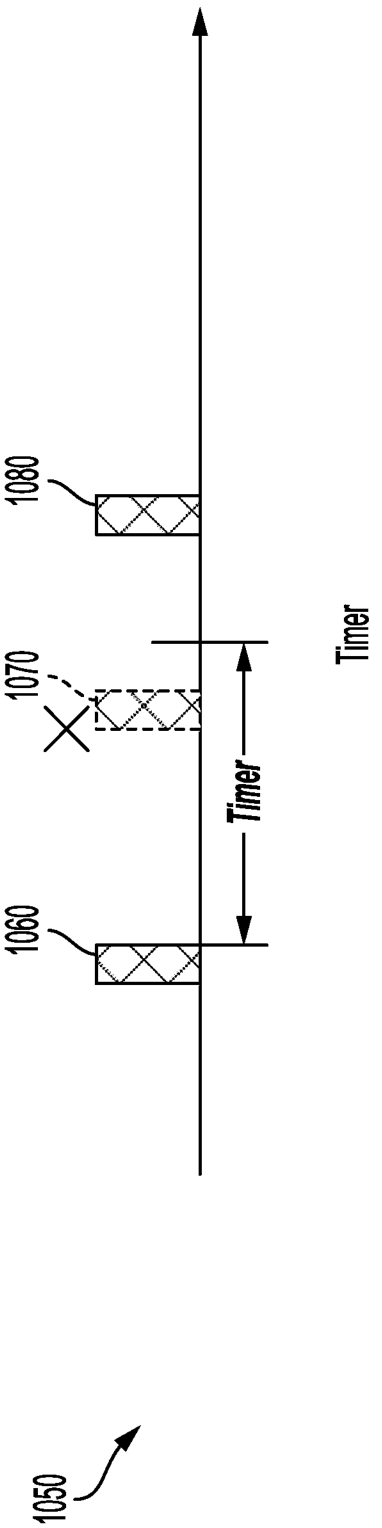

FIGS. 10A and 10B are diagrams illustrating configurations for periodic model status reporting by the UE, according to aspects of the present disclosure. In these aspects of the present disclosure, the network configures periodic model status reporting from a UE to a network based on radio resource control (RRC) signaling. FIG. 10A is a block diagram illustrating a periodic resource pattern 1000, according to aspects of the present disclosure. In this example, the network configures the periodic resource pattern 1000 with uplink (UL) resources 1010 and machine learning model status reporting resources 1020 within the uplink resources. In addition, the network configures the content of the reporting.

FIG. 10B is a diagram 1050 illustrating a timer, according to aspects of the present disclosure. In these aspects of the present disclosure, the network configures the timer, and until the timer expires, transmission of another model status report is prohibited. That is, until the timer expires, the UE should not transmit a next model status report. The timer beneficially avoids overly frequent model status reporting. FIG. 10B illustrates this concept. A report at a first model status reporting resource 1060 is transmitted. After transmission, a timer starts. At a second model status reporting resource 1070 a report is not transmitted because the timer has not expired. After the timer expires, at a third model status reporting resource 1080 a next report is transmitted.

Figure 11A:
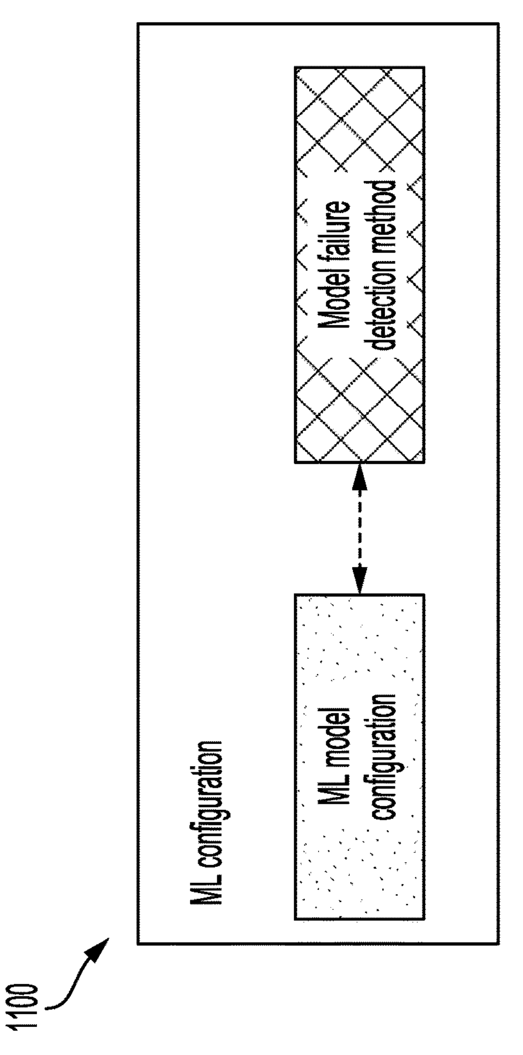
FIGS. 11A and 11B are block diagrams further illustrating the machine learning model configurations of FIGS. 9A and 9B, according to aspects of the present disclosure.
Figure 11B:
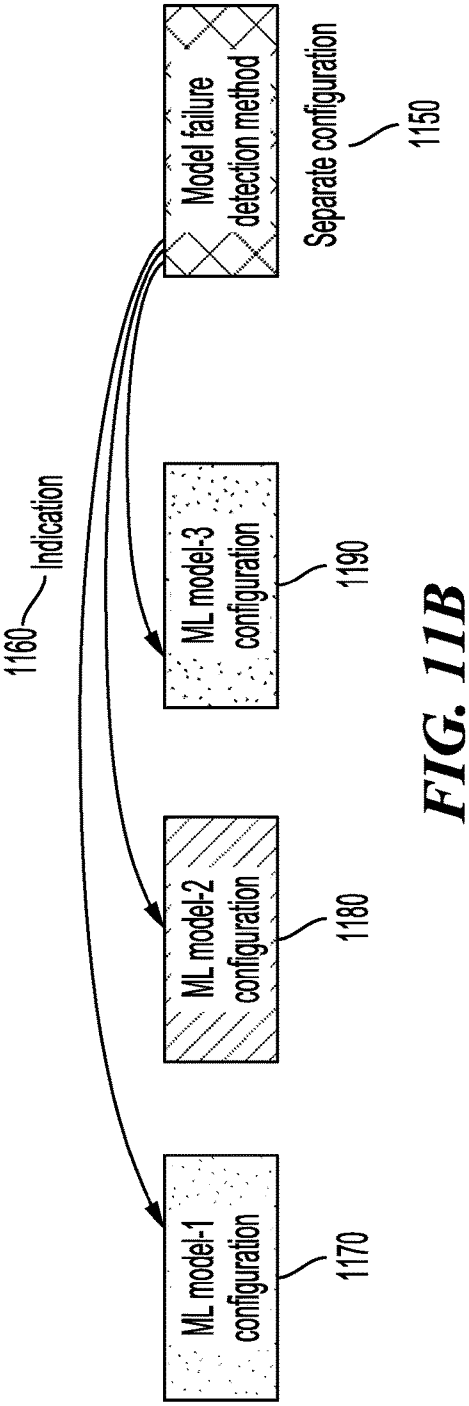

FIGS. 11A and 11B are block diagrams further illustrating the machine learning model configurations of FIGS. 9A and 9B, according to aspects of the present disclosure. FIG. 11A is a block diagram illustrating a machine learning model configuration 1100 according to the first option of FIG. 9A. According to the first option, when the machine learning model configuration 1100 is combined with the model download message of block 804 in FIG. 8, the machine learning model configuration 1100 is for one model. For example, for a channel state feedback (CSF) machine learning model, the network provides the machine learning configuration message, which includes both the machine learning model configuration (e.g., the model information) and the corresponding failure detection method (e.g., the model status reporting configuration).

FIG. 11B is a block diagram illustrating a model failure detection method 1150, according to the second option of FIG. 9B. According to the second option, which is provided using separate signaling, the model failure detection method 1150 may work for all or some of the machine learning model configurations (e.g., 1170, 1180, and 1190). In these aspects of the present disclosure, the separate signaling includes a model indication 1160 for the configuration of the machine learning applications. For example, for a channel state feedback (CSF) machine learning model, after the machine learning model configuration, additional signaling configures the model failure detection method 1150 for all or some of the machine learning model configurations (e.g., 1170, 1180, and 1190), based on the model indication 1160.

The periodic model status reporting described with respect to FIGS. 9A-11B, has multiple options for the UE 810 to determine which/when/whether a model status report is transmitted using a given configured resource. According to a first alternative, the UE 810 transmits the model status report in each configured periodic resource. According to a second alternative, whether a model status report is transmitted using the configured periodic resource is condition-based. For example, the model status report is transmitted by the UE 810 using the configured periodic resource when some conditions are met in some of the machine learning models. That is, the UE 810 may be limited to reporting the status of the models for which the conditions are met using the configured resource. For example, the conditions may be based on a pre-defined threshold.

According to a third alternative, whether a model status report is transmitted using the configured periodic resource is indication-based. That is, the UE 810 is limited to transmitting the model status reports for any model(s) indicated by the network 850. In other words, the UE 810 transmits the model status report of the indicated model(s) in the configured resource.

According to a fourth alternative, whether a model status report is transmitted using the configured resource is priority-based in the event of a reporting conflict. According to these aspects of the present disclosure, when there is a conflict or a lack of resources for transmitting model status reports, the UE 810 is limited to transmitting the model status reports of higher priority models using the configured resource. For example, a channel estimate model may have a higher priority than a layer three (L3) mobility model. In this example, only the channel estimate model reports its status when insufficient resources are present to also report a status of the L3 mobility model. These aspects of the present disclosure report the status of a higher priority machine learning model for wireless communication, such as the noted channel estimate model.

In all of these aspects of the present disclosure, the model status reports may include at least information about a model index and information of a model variation. For example, an indicator bit (1) may indicate the model performance is degrading and an indicator bit (0) may indicate a model performance is not degrading).

Figure 12:
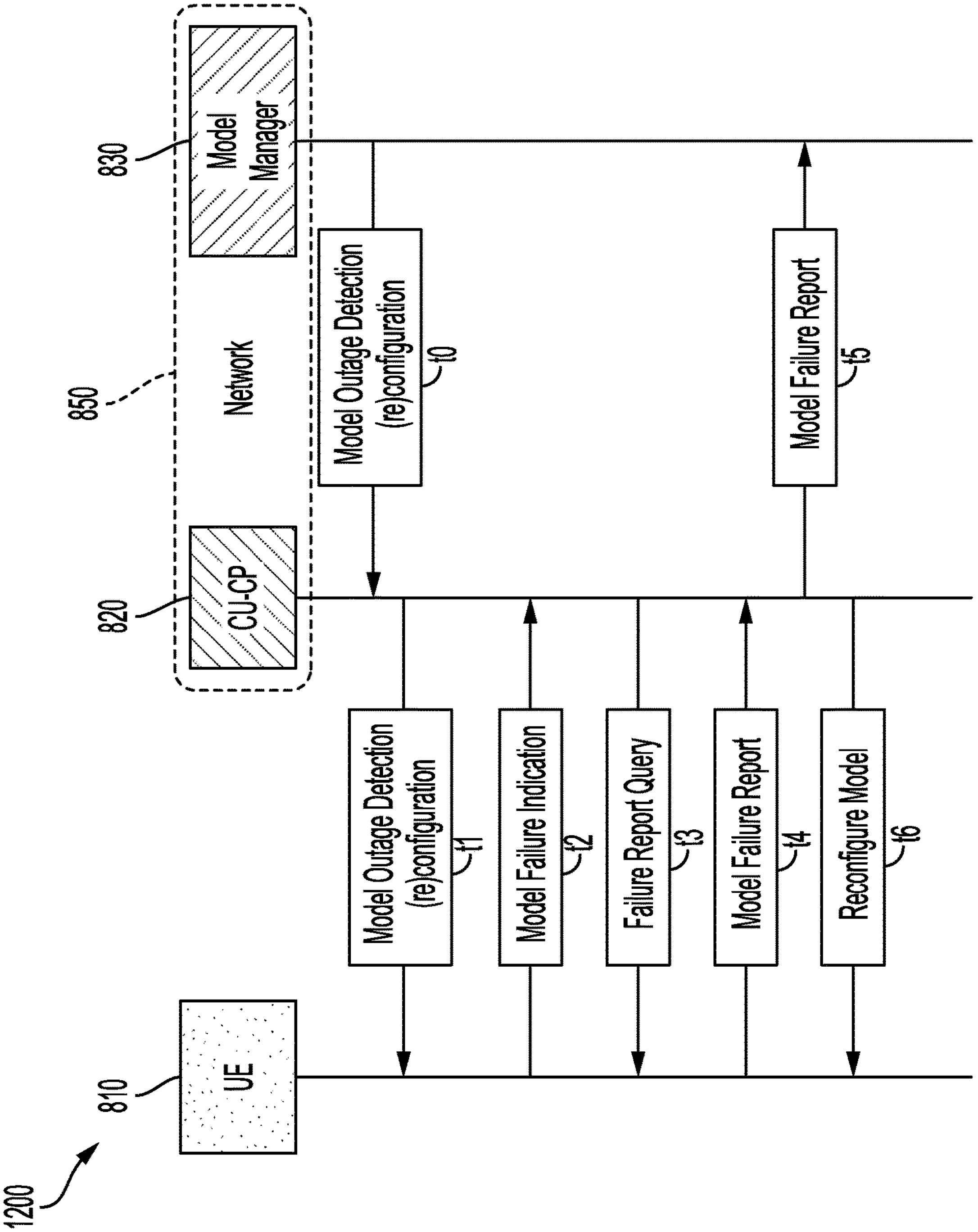
FIG. 12 is a timing diagram illustrating user equipment (UE) triggered machine learning model status reporting, according to aspects of the present disclosure.

FIG. 12 is a timing diagram illustrating a user equipment (UE) triggered machine learning model status report, according to aspects of the present disclosure. FIG. 12 illustrates a process 1200 in response to a detected model outage to maintain a wireless communication link between a user equipment (UE) 810 and a network 850, which may include a centralized unit-control plane (CU-CP) 820, and a model manager 830.

During the process 1200 of FIG. 12, the UE 810 actively sends a reporting request and transmits the model status report back to the network 850. At time t0, the model manager 830 (re)configures a model outage detection method to the CU-CP 820. At time t1, the CU-CP 820 transmits the model outage detection (re)configuration to the UE 810. The (re)configuration occurs as part of or after the model download message of block 804 in FIG. 8. If the UE 810 detects a model failure, at time t2, the UE 810 provides a model failure indication message to the CU-CP 820, which requests resources for model status reporting. At time t3, the CU-CP 820 transmits a failure report query to the UE 810, granting the resources for the report from the UE 810. In response, at time t4, the UE 810 sends a model failure report message to the CU-CP 820. That is, the UE 810 feeds back the model status report (e.g., the logged information and data) to the network 850 based on the outage detection (re)configuration. At time t5, the CU-CP 820 forwards the model failure report to the model manager 830, and at time t6 updates or reconfigures the UE machine learning model for wireless communication to address the reported failure.

In some aspects of the present disclosure, the network defines the model outage detection method by providing a failure instance, a threshold failure instance quantity, and a timer in the model outage detection (re)configuration. In response, the UE 810 performs the model outage detection method by counting a quantity of failure instances within a time period. When the quantity of failure instances within the time period is greater than the threshold failure instance quantity, the UE 810 triggers a model failure action to maintain a wireless communication link with the network 850. The model outage detection method may correspond to one specific machine learning model or all of the machine learning models for wireless communication of the UE 810.

The model outage detection method from the network 850 may provide an explicit mode for model outage detection, such as being directly indicated by system performance. For example, model outage detection may be based on large throughput loss on the UE side. Alternatively, the model outage detection method may provide an implicit mode for model outage detection. For example, the implicit mode may be based on pre-defined rules, such as a current latent code distribution being outside of an expected distribution, or a current confidence probability being lower than an expected value.

Figure 13:
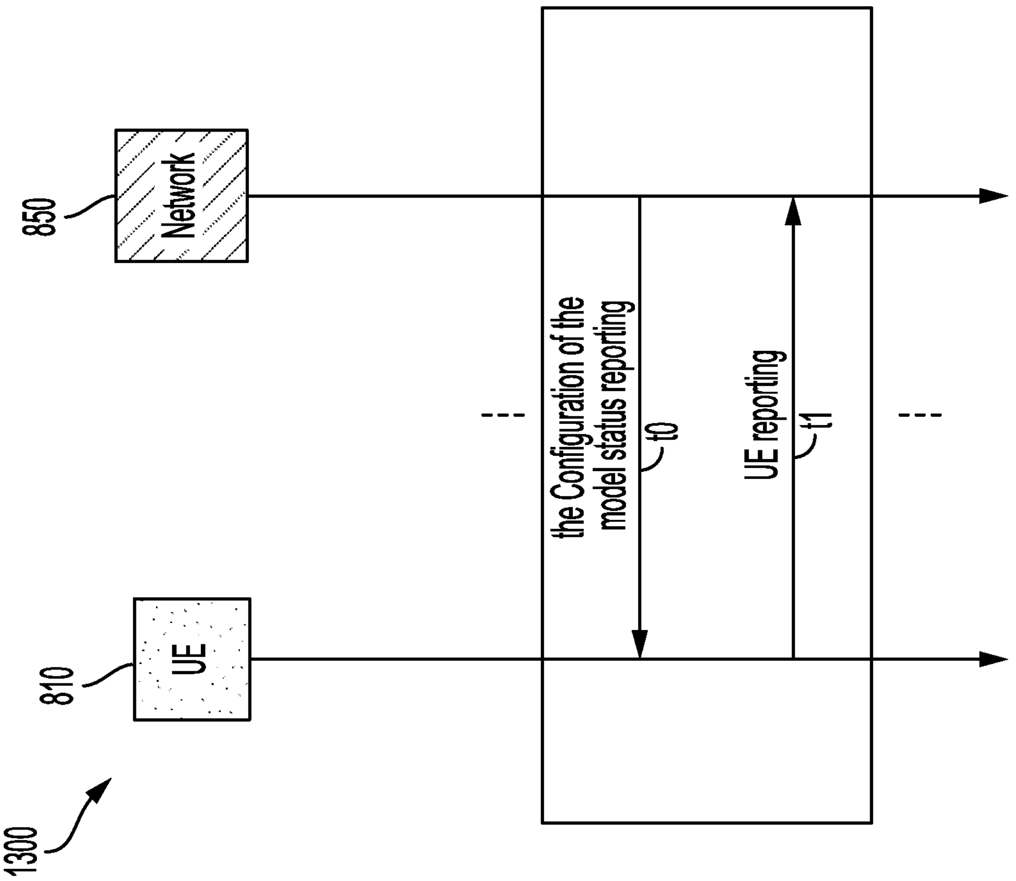
FIG. 13 is a timing diagram illustrating network triggered machine learning model status reporting from a user equipment (UE) to the network, according to aspects of the present disclosure.

FIG. 13 is a timing diagram illustrating network triggered machine learning model status reporting from a user equipment (UE) to the network, according to aspects of the present disclosure. FIG. 13 illustrates a process 1300 in response to a request from a network 850 for a model status report from a UE 810 at time t0. For example, when the network 850 detects a performance loss, or the network 850 desires a check on the status of the machine learning model at the UE 810, the network 850 triggers a model status report from the UE 810 to the network 850. In this example, the network 850 may determine a large performance loss may be caused by a channel estimate machine learning model failure at the UE 810. In response, the network 850 configures and triggers the UE 810 to transmit a model status report to the network 850 at time t1.

In these aspects of the present disclosure, the process 1300 of FIG. 13 involves network configuration of the UE 810 to generate and transmit a model status report. A network request may indicate a model index to identify the model from which to generate and transmit the model status report. The configuration of the model status report may also include an indication of which resources to use to transmit the model report status. The configuration of the model status report may further include an available timer or a specific timestamp for generating the model status report. For example, the network 850 may configure the UE 810 to transmit the model status report for what occurred in the last two time slots. In response, the UE 810 generates the model status report and transmits the model status report to the network at time t1. It is noted that the single event request based reporting described with respect to FIG. 13 differs from configuring periodic reporting, as previously described.

In some aspects of the present disclosure, once a model failure is detected, the UE 810 falls back to a default mode (e.g., non-AI mode, or another machine learning model). Fallback may be determined according to a radio resource control (RRC) configuration, in which one bit may indicate whether or not to fallback. In addition, whether the UE 810 falls back to a non-AI mode, or another machine learning model may be determined according to radio resource control (RRC) signaling. For example, selection between these fallback configurations may be based on a capability of the UE 810. In this example, for a low-tier UE with limited capability, a fallback procedure may not be triggered.

FIGS. 14A-14C are timing diagrams illustrating options to implement a model fallback procedure configured in the event of a model outage detection, according to aspects of the present disclosure. According to aspects of the present disclosure, when failure of a machine learning model for wireless communication of a UE 810 is detected, the UE performs a fallback procedure to maintain a wireless communication link with the network 850.

FIG. 14A is a timing diagram illustrating a UE fallback procedure 1400, according to aspects of the present disclosure. At block 1410, the UE 810 monitors a status of a machine learning model for wireless communication implemented in the UE 810 and detects a model failure. At block 1420, the UE 810 dynamically performs a model fallback, without an additional configuration, to maintain the wireless communication link with the network 850. The fallback may be based on a pre-configured rule or a set of pre-defined rules. At block 1430, the UE 810 performs model failure reporting to the network 850. For example, the UE 810 reports whether a fallback was triggered as well as a default mode of operation.

FIG. 14B is a timing diagram illustrating another UE fallback procedure 1440, according to aspects of the present disclosure. At block 1410, the UE 810 monitors the status of a machine learning model for wireless communication implemented in the UE 810 and detects a model failure. At block 1430, the UE 810 reports the model failure to the network 850. Following block 1430, the UE 810 receives a model fallback indication from the network 850. As a result, the UE performs a model fallback procedure according to the fallback indication received from the network 850 at block 1450.

FIG. 14C is a timing diagram illustrating yet another UE fallback procedure 1460, according to aspects of the present disclosure. At block 1410, the network 850 monitors the status of a machine learning model for wireless communication implemented in the UE 810 and detects a model failure. At block 1450, the network 850 configures a fallback procedure and transmits a model fallback indication to the UE 810. The UE 810 may perform a model fallback procedure according the fallback indication received from by the network 850 at block 1450.

FIGS. 15A and 15B are timing diagrams illustrating processes for machine learning model failure reporting when reporting of model status is triggered by a user equipment (UE), according to aspects of the present disclosure. FIG. 15A is a timing diagram illustrating a first process 1500 for machine learning model failure reporting to a network 850 that is triggered by a UE 810, according to aspects of the present disclosure. At block 1510, a model failure indication and a model status report are transmitted together using an available uplink (UL) grant or using a media access control-control element (MAC-CE). In this example, the UE 810 may transmit a first bit to indicate whether a model failure is detected, and the remaining bits for transmitting the model status report, such as where and when the failure occurred and what caused the failure. In this example, a status report includes a model failure indication and a model status report in a single message.

FIG. 15B is a timing diagram illustrating a second process 1550 for machine learning model failure and status reporting to a network 850 that is triggered by a UE 810, according to aspect of the present disclosure. In these aspects of the present disclosure, a model failure indication and a model status are reported separately. For example, a status report is composed of a first message including a model failure indication and a second message including a model status report. At block 1560, a scheduling request (SR) configuration is received from a centralized unit-control plane (CU-CP) 820 of the network 850. At block 1570, the UE 810 detects a model failure. The model failure indication is transmitted using an available uplink (UL) grant, a normal SR, a dedicated SR, a media access control-control element (MAC-CE), or radio resource control (RRC) signaling.

In these aspects of the present disclosure, if a dedicated SR is configured for and used by the UE 810, the dedicated SR provides the model failure indication. At time t0, the UE 810 sends a scheduling request to a distributed unit (DU) 840 of the network 850. In the example of FIG. 15B, the SR is a dedicated SR. In case the UE transmits a regular scheduling request (not shown), in response to the SR, the UE 810 receives an uplink resource from the DU 840 of the network, such that the network 850 provides an uplink (UL) grant for MAC-CE reporting of the model failure indication.

Returning back to FIG. 15B, in response to the dedicated SR, at time t1 the UE 810 receives a grant for an uplink resource from the DU 840 of the network, for the model failure report. The uplink grant may be for a MAC-CE or an uplink shared channel resource. For example, the network 850 may provide an uplink grant with a same hybrid automatic repeat request (HARD) process or a new data indicator (NDI) to provide the uplink resource. At time t3, a model failure report is transmitted by the UE 810 to the CU-CP 820 of the network 850. The model failure report may be transmitted using another scheduled uplink-shared channel (UL-SCH) or using a MAC-CE.

In an alternative configuration in which a primary cell (Pcell) model failure is detected, the UE 810 triggers a physical random access channel (PRACH) procedure to maintain the wireless communication link with the network 850. This PRACH process may be initiated by the UE 810 if scheduling request resources are unavailable.

As shown in FIGS. 15A and 15B, selection between the first process 1500 and the second process 1550 may be determined based on whether current uplink (UL) resource are sufficient to transmit both the model failure indication and the model status report. Content of the model failure report transmitted at time t3 of FIG. 15B and block 1510 of FIG. 15A may include input data that caused the failure, a statistics/distribution of the input data, a payload size of the report/input-data, a suggested model index, a fallback mode, a default model index, and the like. The contents of the model failure report may vary according to a capability of the UE 810. For example, for a low-tier UE, the logged data may not be included in the model failure report. The content may be network configured. For example, the network way indicate whether raw samples or extracted features for the raw samples are reported. The configuration may be based on the configured reporting method or may be model specific.

In some aspects of the present disclosure, the machine learning models for wireless communication may have different priorities. For instance, a beam failure recovery (BFR) process may have a higher priority than an AI-based channel state feedback (CSF) application. Similarly, an AI-based control/data detection process may have higher priority than an AI-based CSF application. For example, if a beam failure recovery (BFR) process and an AI-based channel state feedback application failure occur simultaneously, a BFR report is prioritized if there are not enough available uplink resources. In timer-based configurations of the procedures of FIGS. 15A and 15B, the UE 810 may set up a timer for the UE 810 to prevent reporting a next model failure report to soon, if a previous report is not acknowledged by the network 850.

FIGS. 16A and 16B are timing diagrams illustrating a signaling flow among a user equipment (UE) and a network to reconfigure a model in response to reporting of a model status failure, according to aspects of the present disclosure. FIGS. 16A and 16B illustrate network responses to the model failure including the network improving the model by generating a new machine learning model or an updated machine learning model at the UE 810. FIG. 16A illustrates a first process 1600, in which the network 850 triggers a new model configuration in response to a model failure. In this option, the network 850 transmits a new model in the model download message at block 1610. For example, the network 850 may reset the machine learning model at the UE 810 by issuing the model download message at block 1610.

FIG. 16B illustrates a second process 1650, in which the network 850 configures a model update 1660 without a configuration of a new model. For example, the network 850 may transmit a differential update, in other words a difference between a new model and the previous model. In other examples, the model remains the same but the network transmits different parameters for the model. In each case, the network updates the machine learning model with the model update 1660.

In still other aspects, (not shown) the network may indicate a fallback mode in response to the model failure. In these aspects, the network 850 may send a radio resource control (RRC) response message in response to a model failure indication from the UE 810.

According to aspects of the present disclosure, during a model status monitoring phase, a machine learning model outage detection is performed. In response to a model outage detection for wireless communication, steps are taken to maintain a wireless communication link. In these aspects of the present disclosure, a user equipment (UE) communicates with a network based on a machine learning model for wireless communication. During communication, a status of the machine learning model for wireless communication is monitored. This method includes reporting the status of the machine learning model for wireless communication using a predetermined resource according to a predetermined format. In these aspects of the present disclosure, the method includes falling back to communicating with a fallback procedure, instead of the machine learning model for wireless communication. The fallback procedure maintains wireless communication with the network in response to the status of the machine learning model indicating a model failure.

Figure 17:
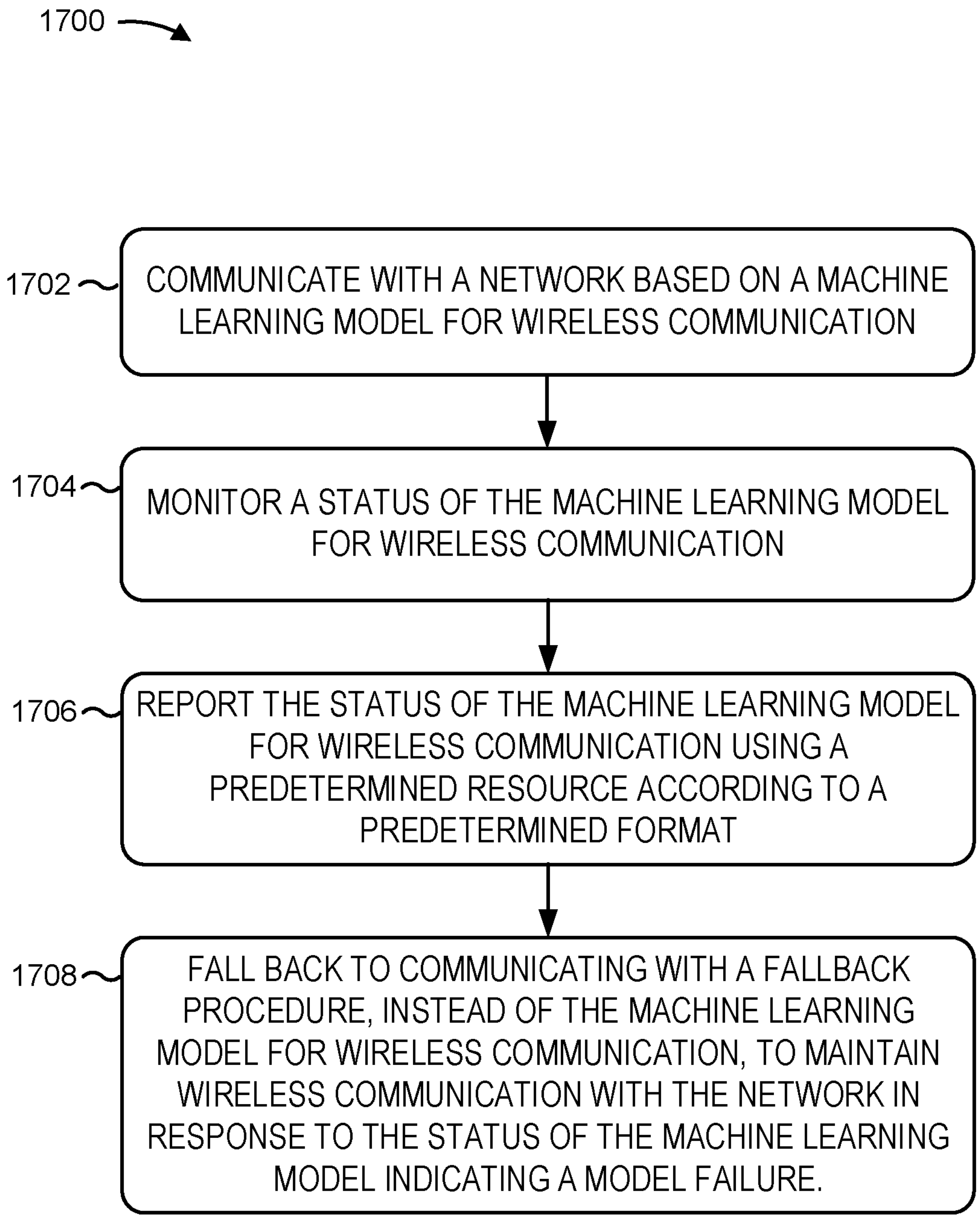
FIG. 17 is a flow diagram illustrating an example process performed, for example, by a user equipment (UE), to perform a model status failure reporting procedure, in accordance with various aspects of the present disclosure.

FIG. 17 is a flow diagram illustrating an example process 1700 performed, for example, by a user equipment (UE), to perform a model status failure reporting procedure, in accordance with various aspects of the present disclosure. The process 1700 is an example of a 5G new radio (NR) UE enhancement to support operation using a machine learning model for wireless communication.

As shown in FIG. 17, in some aspects, the process 1700 includes communicating with a network based on a machine learning model for wireless communication (block 1702). For example, the UE (e.g., using the antenna 252, the DEMOD/MOD 254, the MIMO detector 256, the receive processor 258, the transmit processor 264, the TX MIMO processor 266, the controller/processor 280, and/or the memory 282) can communicate with the network based on the machine learning model for wireless communication. For example, as shown in FIG. 6, the AI-based E2E wireless system 600, communicates using a machine learning model for wireless communication within a transmitter (Tx) 610 and/or a receiver (Rx) 650, according to aspects of the present disclosure. In this example, the AI-based E2E wireless system 600 shows the transmitter 610 of a base station 602 and the receiver 650 of the UE 640. In this configuration, the machine learning model for wireless communication (e.g., the transmitter neural network 612) replaces encoding, modulation, and/or precoding modules in the transmitter 610. In addition, the machine learning model for wireless communication (e.g., the receiver neural network 652) replaces synchronization, channel estimation, detection, demodulation, and/or decoding components in the receiver 650.

In some aspects, the process 1700 further includes monitoring a status of the machine learning model for wireless communication (block 1704). For example, the UE (e.g., using the antenna 252, the DEMOD/MOD 254, the MIMO detector 256, the receive processor 258, the transmit processor 264, the TX MIMO processor 266, the controller/processor 280, and/or the memory 282) can monitor the status of the machine learning model for wireless communication. For example, as shown in FIG. 14A, at block 1410, the UE 810 monitors a status of a machine learning model for wireless communication implemented in the UE 810.

In some aspects, the process 1700 further includes reporting the status of the machine learning model for wireless communication using a predetermined resource according to a predetermined format (block 1706). For example, the UE (e.g., using the DEMOD/MOD 254, the transmit processor 264, the TX MIMO processor 266, the controller/processor 280, and/or the memory 282) can report the status of the machine learning model for wireless communication using the predetermined resource according to the predetermined format. For example, as shown in FIG. 14A, at block 1430, the UE 810 performs model failure reporting to the network 850. For example, the UE 810 reports whether a fallback was triggered as well as a default mode of operation.

In some aspects, the process 1700 further includes falling back to communicating with a fallback procedure, instead of the machine learning model for wireless communication, to maintain wireless communication with the network in response to the status of the machine learning model indicating a model failure (block 1708). For example, the UE (e.g., using the DEMOD/MOD 254, the MIMO detector 256, the receive processor 258, the transmit processor 264, the TX MIMO processor 266, the controller/processor 280, and/or the memory 282) can fall back to communicating with the fallback procedure. For example, as shown in FIG. 14A, at block 1420, the UE 810 dynamically performs a model fallback, without an additional configuration, to maintain the wireless communication link with the network 850. The fallback may be based on a pre-configured rule or a set of pre-defined rules.

Figure 18:
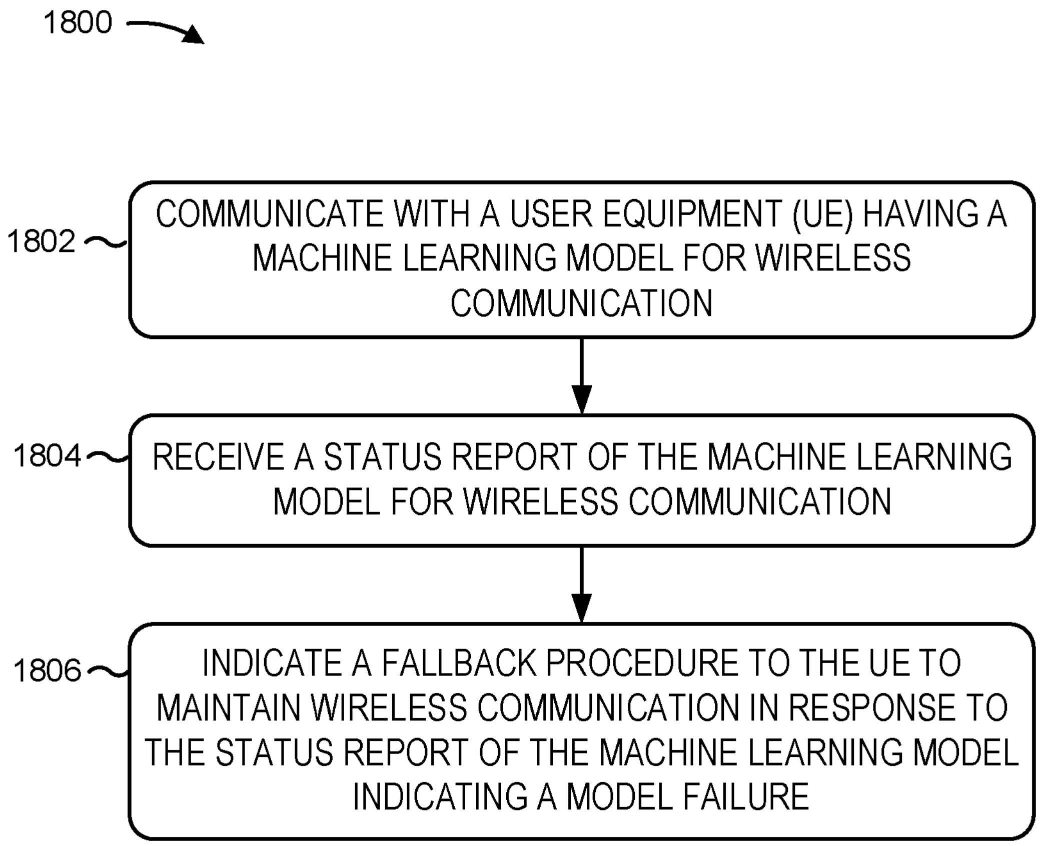
FIG. 18 is a flow diagram illustrating an example process performed, for example, by a network device, to configure a model status failure reporting procedure, in accordance with various aspects of the present disclosure.

FIG. 18 is a flow diagram illustrating an example process 1800 performed, for example, by a network device, to configure a model status failure reporting procedure, in accordance with various aspects of the present disclosure. The process 1800 is an example of a 5G new radio (NR) network enhancement to support operation using a machine learning model for wireless communication.

As shown in FIG. 18, in some aspects, the process 1800 includes communicating with a user equipment (UE) having a machine learning model for wireless communication (block 1802). For example, the base station (e.g., using the DEMOD/MOD 232, the MIMO detector 236, the receive processor 238, the TX MIMO detector 230, the transmit processor 220, the controller/processor 240, and/or the memory 242) can communicate with the UE having the machine learning model for wireless communication. For example, as shown in FIG. 6, the AI-based E2E wireless system 600, communicates using a machine learning model for wireless communication within a transmitter (Tx) 610 and/or a receiver (Rx) 650, according to aspects of the present disclosure. In this example, the AI-based E2E wireless system 600 shows the transmitter 610 of a base station 602 and the receiver 650 of the UE 640.

In some aspects, the process 1800 further includes receiving a status report of the machine learning model for wireless communication (block 1804). For example, the base station (e.g., using the antenna 234, the DEMOD/MOD 232, the MIMO detector 236, the receive processor 238, the controller/processor 240, and/or the memory 242) can receive the status report of the machine learning model. For example, as shown in FIG. 14B, at block 1430, the UE 810 reports the model failure to the network 850.

In some aspects, the process 1800 further includes indicating a fallback procedure to the UE to maintain wireless communication in response to the status report of the machine learning model indicating a model failure (block 1806). For example, the base station (e.g., using the antenna 234, the DEMOD/MOD 232, the TX MIMO detector 230, the transmit processor 220, the controller/processor 240, and/or the memory 242) can indicate the fallback procedure to the UE to maintain wireless communication in response to the status report of the machine learning model indicating the model failure. For example, as shown in FIG. 14B, following block 1430, the UE 810 receives a model fallback indication from the network 850. As a result, the UE performs a model fallback procedure according to the fallback indication received from the network 850 at block 1450.

Implementation examples are described in the following numbered clauses:

1. A method of wireless communications by a user equipment (UE), comprising:
   - communicating with a network based on a machine learning model for wireless communication;
   - monitoring a status of the machine learning model for wireless communication;
   - reporting the status of the machine learning model for wireless communication using a predetermined resource according to a predetermined format; and
   - falling back to communicating with a fallback procedure, instead of the machine learning model for wireless communication, to maintain wireless communication with the network in response to the status of the machine learning model indicating a model failure.
2. The method of clause 1, in which reporting is based on a configuration received from the network for periodic reporting of the status of the machine learning model for wireless communication.
3. The method of clause 2, further comprising receiving the configuration for the reporting in a message including a download of the machine learning model for wireless communication.
4. The method of clause 2, further comprising receiving the configuration for the reporting in a message separate from a download of the machine learning model for wireless communication, the message indicating a model to which the configuration applies.
5. The method of any of clauses 1-4, in which reporting comprises reporting of the status of the machine learning model in response to a timer expiring.
6. The method of clause 1, further comprising reporting the status of the machine learning model for wireless communication in response to at least one of a condition being satisfied or receiving an indication from the network.
7. The method of clause 1, further comprising further comprising reporting the status of the machine learning model for wireless communication in response to a reporting conflict, by reporting the status of a higher priority machine learning model for wireless communication.
8. The method of clause 1, in which the reporting further comprises:
   - indicating to the network the model failure; and
   - reporting the model status, in response receiving a failure report query.
9. The method of clause 1, further comprising triggering the reporting in response to a quantity of failure instances exceeding a threshold failure instance quantity within a time period.

10. The method of clause 1, in which reporting comprises reporting the status of the machine learning model in response to a network request.

11. The method of clause 10, in which the network request indicates a time period in which to report the status of the machine learning model.

12. The method of any of clauses 1-11, in which the falling back occurs in response to a pre-configured rule, the method further comprising reporting the falling back to the network.

13. The method of any of clauses 1-11, in which the falling back occurs in response to a network configured fallback procedure.

14. The method of any of clauses 1-13, in which reporting further comprises transmitting, to the network, a model failure indication and a model status report together.

15. The method of any of clauses 1-13, in which reporting further comprises separately transmitting, to the network, a model failure indication and a model status report.

16. The method of any of clauses 1-15, in which the fallback procedure comprises receiving, from the network, a new machine learning model or an updated machine learning model.

17. A method of wireless communications by a network, comprising:

communicating with a user equipment (UE) having a machine learning model for wireless communication;

receiving a status report of the machine learning model for wireless communication; and indicating a fallback procedure to the UE to maintain wireless communication in response to the status report of the machine learning model indicating a model failure.

18. The method of clause 17, further comprising configuring periodic reporting of the status report.

19. The method of clause 17, further comprising configuring periodic reporting in a message including a download of the machine learning model.

20. The method of clause 17, further comprising configuring periodic reporting in a message separate from a download of the machine learning model.

21. The method of any of clauses 17-20, in which the status report comprises a first message including a model failure indication and a second message including the model status report.

22. The method of any of clauses 17-20, in which the status report comprises a single message including a model failure indication and the model status report.

23. The method of any of clauses 17-22, further comprising transmitting a request to the UE to provide the status report of the machine learning model.

24. The method of clause 23, in which the request indicates a time period for when to cover with the status report of the machine learning model.

25. The method of any of clauses 17-24, in which indicating the fallback procedure comprises transmitting, to the UE, a new machine learning model or an updated machine learning model.

26. A user equipment (UE), comprising:

a processor;

a memory coupled with the processor; and instructions stored in the memory and operable, when executed by the processor, to cause the UE:

to communicate with a network based on a machine learning model for wireless communication, to monitor a status of the machine learning model for wireless communication, to report the status of the machine learning model for wireless communication using a predetermined resource according to a predetermined format, and to fall back to communicating with a fallback procedure, instead of the machine learning model for wireless communication, to maintain wireless communication with the network in response to the status of the machine learning model indicating a model failure.

27. The UE of clause 26, in which the instruction to report the status is based on a configuration received from the network for periodic reporting of the status of the machine learning model for wireless communication or in response to a request from the network.

28. The UE of any of clauses 26-27, in which the fallback procedure comprises a new machine learning model or an updated machine learning model for wireless communication received from the network.

29. A network, comprising:

a processor;

a memory coupled with the processor; and instructions stored in the memory and operable, when executed by the processor, to cause the network:

to communicate with a user equipment (UE) having a machine learning model for wireless communication, to receive a status report of the machine learning model for wireless communication, and to indicate a fallback procedure to the UE to maintain wireless communication in response to the status report of the machine learning model indicating a model failure.

30. The network of clause 29, in which the instructions further cause the network to configure periodic reporting of the status report or transmit a request to the UE to provide the status report of the machine learning model.

The foregoing disclosure provides illustration and description, but is not intended to be exhaustive or to limit the aspects to the precise form disclosed. Modifications and variations may be made in light of the above disclosure or may be acquired from practice of the aspects.

As used, the term "component" is intended to be broadly construed as hardware, firmware, and/or a combination of hardware and software. As used, a processor is implemented in hardware, firmware, and/or a combination of hardware and software.

Some aspects are described in connection with thresholds. As used, satisfying a threshold may, depending on the context, refer to a value being greater than the threshold, greater than or equal to the threshold, less than the threshold, less than or equal to the threshold, equal to the threshold, not equal to the threshold, and/or the like.

It will be apparent that systems and/or methods described may be implemented in different forms of hardware, firmware, and/or a combination of hardware and software. The actual specialized control hardware or software code used to implement these systems and/or methods is not limiting of the aspects. Thus, the operation and behavior of the systems and/or methods were described without reference to specific software code—it being understood that software and hardware can be designed to implement the systems and/or methods based, at least in part, on the description.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. A phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used should be construed as critical or essential unless explicitly described as such. Also, as used, the articles "a" and "an" are intended to include one or more items, and may be used interchangeably with "one or more." Furthermore, as used, the terms "set" and "group" are intended to include one or more items (e.g., related items, unrelated items, a combination of related and unrelated items, and/or the like), and may be used interchangeably with "one or more." Where only one item is intended, the phrase "only one" or similar language is used. Also, as used, the terms "has," "have," "having," and/or the like are intended to be open-ended terms. Further, the phrase "based on" is intended to mean "based, at least in part, on" unless explicitly stated otherwise.

What is claimed is:

1. A method of wireless communications by a user equipment (UE), comprising:
- communicating with a network based on a machine learning model for wireless communication;
- monitoring a status of the machine learning model for wireless communication;
- reporting the status of the machine learning model for wireless communication using a predetermined resource according to a predetermined format;
- falling back to communicating with a fallback procedure in response to a pre-configured rule and/or a network configured fallback procedure, instead of the machine learning model for wireless communication, to maintain wireless communication with the network in response to the status of the machine learning model indicating a model failure; and
- reporting the falling back to the network.

2. The method of claim 1, in which reporting the status of the machine learning model is based on a configuration received from the network for periodic reporting of the status of the machine learning model for wireless communication.

3. The method of claim 2, further comprising receiving the configuration for the reporting of the status of the machine learning model in a message including a download of the machine learning model for wireless communication.

4. The method of claim 2, further comprising receiving the configuration for the reporting of the status of the machine learning model in a message separate from a download of the machine learning model for wireless communication, the message indicating a model to which the configuration applies.

5. The method of claim 2, in which reporting the status of the machine learning model comprises reporting of the status of the machine learning model in response to a timer expiring.

6. The method of claim 1, further comprising reporting the status of the machine learning model for wireless communication in response to at least one of a condition being satisfied or receiving an indication from the network.

7. The method of claim 1, further comprising reporting the status of the machine learning model for wireless communication in response to a reporting conflict, by reporting the status of a higher priority machine learning model for wireless communication.

8. The method of claim 1, in which the reporting the status of the machine learning model further comprises:
- indicating to the network the model failure; and
- reporting the model status, in response to receiving a failure report query.

9. The method of claim 1, further comprising triggering the reporting of the status of the machine learning model in response to a quantity of failure instances exceeding a threshold failure instance quantity within a time period.

10. The method of claim 1, in which reporting the status of the machine learning model comprises reporting the status of the machine learning model in response to a network request.

11. The method of claim 10, in which the network request indicates a time period in which to report the status of the machine learning model.

12. The method of claim 1, in which reporting the status of the machine learning model further comprises transmitting, to the network, a model failure indication and a model status report together.

13. The method of claim 1, in which reporting the status of the machine learning model further comprises separately transmitting, to the network, a model failure indication and a model status report.

14. The method of claim 1, in which the fallback procedure comprises receiving, from the network, a new machine learning model or an updated machine learning model.

15. A method of wireless communications by a network, comprising:
- communicating with a user equipment (UE) having a machine learning model for wireless communication;
- receiving a status report of the machine learning model for wireless communication;
- indicating a fallback procedure to the UE to maintain wireless communication in response to the status report of the machine learning model indicating a model failure; and
- configuring periodic reporting of the status report in a message separate from a download of the machine learning model or a message including the download of the machine learning model.

16. The method of claim 15, in which the status report comprises a first message including a model failure indication and a second message including the model status report.

17. The method of claim 15, in which the status report comprises a single message including a model failure indication and the model status report.

18. The method of claim 15, further comprising transmitting a request to the UE to provide the status report of the machine learning model.

19. The method of claim 18, in which the request indicates a time period for when to cover with the status report of the machine learning model.

20. The method of claim 15, in which indicating the fallback procedure comprises transmitting, to the UE, a new machine learning model or an updated machine learning model.

21. A user equipment (UE), comprising:
- a processor;
- a memory coupled with the processor; and
- instructions stored in the memory and operable, when executed by the processor, to cause the UE:
  - to communicate with a network based on a machine learning model for wireless communication, to monitor a status of the machine learning model for wireless communication, to report the status of the machine learning model for wireless communication using a predetermined resource according to a predetermined format, to fall back to communicating with a fallback procedure in response to a pre-configured rule and/or a network configured fallback procedure, instead of the machine learning model for wireless communication, to maintain wireless communication with the network in response to the status of the machine learning model indicating a model failure; and to report the fall back to the network.

22. The UE of claim 21, in which the instruction to report the status is based on a configuration received from the network for periodic reporting of the status of the machine learning model for wireless communication or in response to a request from the network.

23. The UE of claim 21, in which the fallback procedure comprises a new machine learning model or an updated machine learning model for wireless communication received from the network.

24. A network, comprising:

a processor, a memory coupled with the processor; and instructions stored in the memory and operable, when executed by the processor, to cause the network:

to communicate with a user equipment (UE) having a machine learning model for wireless communication, to receive a status report of the machine learning model for wireless communication, to indicate a fallback procedure to the UE to maintain wireless communication in response to the status report of the machine learning model indicating a model failure; and to configure periodic reporting in a message, separate from a download of the machine learning model.

25. The network of claim 24, in which the instructions further cause the network to transmit a request to the UE to provide the status report of the machine learning model.

* * * * *